US 7,624,204 B2

(12) United States Patent
Furtek et al.

(10) Patent No.: US 7,624,204 B2
(45) Date of Patent: Nov. 24, 2009

(54) INPUT/OUTPUT CONTROLLER NODE IN AN ADAPTABLE COMPUTING ENVIRONMENT

(75) Inventors: Frederick Curtis Furtek, Menlo Park, CA (US); Paul L. Master, Sunnyvale, CA (US); Robert Thomas Plunkett, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 100 days.

(21) Appl. No.: 10/719,409

(22) Filed: Nov. 22, 2003

(65) Prior Publication Data

US 2004/0181614 A1    Sep. 16, 2004

Related U.S. Application Data

(63) Continuation-in-part of application No. 09/815,122, filed on Mar. 22, 2001, now Pat. No. 6,836,839.

(60) Provisional application No. 60/428,591, filed on Nov. 22, 2002.

(51) Int. Cl.
*G06F 3/00* (2006.01)
*G06F 13/00* (2006.01)

(52) U.S. Cl. .................. 710/33; 710/72; 710/316
(58) Field of Classification Search .................. 710/33, 710/72, 316
See application file for complete search history.

(56) References Cited

U.S. PATENT DOCUMENTS

| | | | |
|---|---|---|---|
| 4,758,985 A | 7/1988 | Carter | |
| 4,905,231 A | 2/1990 | Leung et al. | |
| 5,144,166 A | 9/1992 | Camarota et al. | |
| 5,218,240 A | 6/1993 | Camarota et al. | |
| 5,245,227 A | 9/1993 | Furtek et al. | |
| 5,336,950 A | 8/1994 | Popli et al. | |
| 5,388,062 A | 2/1995 | Knutson | |
| 5,450,557 A | 9/1995 | Kopp et al. | |
| 5,469,003 A * | 11/1995 | Kean | 326/39 |
| 5,646,544 A | 7/1997 | Iadanza | |
| 5,729,754 A | 3/1998 | Estes | |
| 5,737,631 A | 4/1998 | Trimberger | |
| 5,796,957 A | 8/1998 | Yamamoto et al. | |
| 5,802,055 A | 9/1998 | Krein et al. | |
| 5,828,858 A | 10/1998 | Athanas et al. | |
| 5,889,816 A | 3/1999 | Agrawal et al. | |
| 5,892,961 A | 4/1999 | Trimberger | |

(Continued)

*Primary Examiner*—Tariq R. Hafiz
*Assistant Examiner*—Scott Sun
(74) *Attorney, Agent, or Firm*—Patterson & Sheridan, LLP

(57) ABSTRACT

A reconfigurable input/output controller (IOC) allows an adaptive computing engine (ACE) to communicate with external devices. The external devices can comprise a separate system on chip (SOC) or can be other devices or resources such as audio/visual output devices, memory, network or other communications, etc. The IOC allows different modes of transfer and performs necessary translation of input and output commands. In one embodiment, the IOC adheres to standard messaging and communication protocol used by other nodes in the ACE. This approach allows a uniform approach to the ACE design and provides advantages in scalability and adaptability of the ACE system. One feature of the invention provides a physical link adapter for accommodating different external communication types such as, RS231, optical, Firewire, universal synchronous bus (USB), etc. The physical link adapter uses a reconfigurable finite state machine, selectable couplings and a bus switch to allow connection of different communication types' signals to a common ACE component such as to an IOC.

14 Claims, 18 Drawing Sheets

U.S. PATENT DOCUMENTS

| | | | |
|---|---|---|---|
| 5,907,580 A | 5/1999 | Cummings | |
| 5,910,733 A | 6/1999 | Bertolet et al. | |
| 5,943,242 A | 8/1999 | Vorbach et al. | |
| 5,959,881 A | 9/1999 | Trimberger et al. | |
| 5,963,048 A | 10/1999 | Harrison et al. | |
| 5,966,534 A | 10/1999 | Cooke et al. | |
| 5,970,254 A | 10/1999 | Cooke et al. | |
| 6,021,490 A | 2/2000 | Vorbach et al. | |
| 6,023,742 A | 2/2000 | Ebeling et al. | |
| 6,081,903 A | 6/2000 | Vorbach et al. | |
| 6,088,043 A | 7/2000 | Kelleher et al. | |
| 6,094,065 A | 7/2000 | Tavana et al. | |
| 6,119,178 A | 9/2000 | Martin et al. | |
| 6,119,181 A | 9/2000 | Vorbach et al. | |
| 6,120,551 A | 9/2000 | Law et al. | |
| 6,150,838 A | 11/2000 | Wittig et al. | |
| 6,230,307 B1 | 5/2001 | Davis et al. | |
| 6,237,029 B1 | 5/2001 | Master et al. | |
| 6,266,760 B1 | 7/2001 | DeHon et al. | |
| 6,282,627 B1 | 8/2001 | Wong et al. | |
| 6,338,106 B1 | 1/2002 | Vorbach et al. | |
| 6,353,841 B1 | 3/2002 | Marshall et al. | |
| 6,381,293 B1 | 4/2002 | Lee et al. | |
| 6,405,299 B1 | 6/2002 | Vorbach et al. | |
| 6,408,039 B1 | 6/2002 | Ito | |
| 6,425,068 B1 | 7/2002 | Vorbach et al. | |
| 6,426,649 B1 | 7/2002 | Fu et al. | |
| 6,433,578 B1 | 8/2002 | Wasson | |
| 6,480,937 B1 | 11/2002 | Vorbach et al. | |
| 6,483,343 B1 | 11/2002 | Faith et al. | |
| 6,510,138 B1 | 1/2003 | Pannell | |
| 6,542,998 B1 | 4/2003 | Vorbach et al. | |
| 6,571,381 B1 | 5/2003 | Vorbach et al. | |
| 6,675,284 B1 * | 1/2004 | Warren | 712/38 |
| 6,694,380 B1 * | 2/2004 | Wolrich et al. | 710/5 |
| 6,697,979 B1 | 2/2004 | Vorbach et al. | |
| 6,859,434 B2 | 2/2005 | Segal et al. | |
| 6,941,336 B1 | 9/2005 | Mar | |
| 6,980,515 B1 * | 12/2005 | Schunk et al. | 370/230.1 |
| 7,003,660 B2 | 2/2006 | Vorbach et al. | |
| 7,210,129 B2 | 4/2007 | May et al. | |
| 7,266,725 B2 | 9/2007 | Vorbach et al. | |
| 7,394,284 B2 | 7/2008 | Vorbach | |
| 7,434,191 B2 | 10/2008 | Vorbach et al. | |
| 7,444,531 B2 | 10/2008 | Vorbach et al. | |
| 2001/0010074 A1 * | 7/2001 | Nishihara et al. | 712/227 |
| 2001/0052793 A1 * | 12/2001 | Nakaya | 326/41 |
| 2002/0015401 A1 * | 2/2002 | Subramanian et al. | 370/347 |
| 2002/0042875 A1 * | 4/2002 | Shukla | 713/151 |
| 2002/0138716 A1 * | 9/2002 | Master et al. | 712/227 |
| 2002/0184275 A1 | 12/2002 | Dutta et al. | |
| 2003/0074473 A1 * | 4/2003 | Pham et al. | 709/246 |

\* cited by examiner

```
  50            43 42 41    38 37      32 31                                                              0
   |  nid       | o | 1 0 1 0 |         |                                                                 |
```

Fig. 41

```
  50         45 44 43 42 41    38 37      32 31                                                           0
   |  MemID  | nid  | S | 1 1 0 0 | nid  |                              A32                               |
                     [7:6]            [5:0]
```

FIG. 42

```
  50            43 42 41    38 37      32 31                                                              0
   |  nid       | o | 1 1 0 1 |         |                              D32                                |
```

FIG. 43

```
  50            43 42 41    38 37      32 31                                                 4 3          0
   |  nid       | o | 1 0 1 0 | 0 0 0 0 0 0 |                                              |  Interrupt   |
```

FIG. 44

IOC Top Level Block Diagram

INPUT/OUTPUT CONTROLLER NODE IN AN ADAPTABLE COMPUTING ENVIRONMENT

CLAIM OF PRIORITY

This application claims priority from U.S. Provisional Patent Application No. 60/428,591, filed on Nov. 22, 2002; that is hereby incorporated by reference as if set forth in full in this application for all purposes.

CROSS REFERENCE TO RELATED APPLICATIONS

This application is a continuation-in-part of U.S. Ser. No. 09/815,122, entitled "Adaptive Integrated Circuitry with Heterogeneous and Reconfigurable Matrices of Diverse and Adaptive Computational Units having Fixed, Application Specific Computational Elements," filed on Mar. 22, 2001 and hereby incorporated herein by reference, which issued as U.S. Pat. No. 6,836,839 on Dec. 28, 2004. This application is also related to U.S. Ser. No. 10/443,554, entitled "Uniform Interface for a Functional Node in an Adaptive Computing Engine," filed on May 21, 2003, hereby incorporated herein by reference.

BACKGROUND OF THE INVENTION

The present invention is related in general to memory controllers and more specifically to the design of a memory controller for use in an adaptive computing environment.

The advances made in the design and development of integrated circuits ("ICs") have generally produced information-processing devices falling into one of several distinct types or categories having different properties and functions, such as microprocessors and digital signal processors ("DSPs"), application specific integrated circuits ("ASICs"), and field programmable gate arrays ("FPGAs"). Each of these different types or categories of information-processing devices have distinct advantages and disadvantages.

Microprocessors and DSPs, for example, typically provide a flexible, software-programmable solution for a wide variety of tasks. The flexibility of these devices requires a large amount of instruction decoding and processing, resulting in a comparatively small amount of processing resources devoted to actual algorithmic operations. Consequently, microprocessors and DSPs require significant processing resources, in the form of clock speed or silicon area, and consume significantly more power compared with other types of devices.

ASICs, while having comparative advantages in power consumption and size, use a fixed, "hard-wired" implementation of transistors to implement one or a small group of highly specific tasks. ASICs typically perform these tasks quite effectively; however, ASICs are not readily changeable, essentially requiring new masks and fabrication to realize any modifications to the intended tasks.

FPGAs allow a degree of post-fabrication modification, enabling some design and programming flexibility. FPGAs are comprised of small, repeating arrays of identical logic devices surrounded by several levels of programmable interconnects. Functions are implemented by configuring the interconnects to connect the logic devices in particular sequences and arrangements. Although FPGAs can be reconfigured after fabrication, the reconfiguring process is comparatively slow and is unsuitable for most real-time, immediate applications. Additionally, FPGAs are very expensive and very inefficient for implementation of particular functions. An algorithmic operation implemented on an FPGA may require orders of magnitude more silicon area, processing time, and power than its ASIC counterpart, particularly when the algorithm is a poor fit to the FPGA's array of homogeneous logic devices.

An adaptive computing engine (ACE) or adaptable computing machine (ACM) allows a collection of hardware resources to be rapidly configured for different tasks. Resources can include, e.g., processors, or nodes, for performing arithmetic, logical and other functions. The nodes are provided with an interconnection system that allows communication among nodes and communication with resources such as memory, input/output ports, etc.

One type of valuable processing includes input/output services to allow nodes to communicate with external components, devices or resources.

SUMMARY OF THE INVENTION

A reconfigurable input/output controller (IOC) allows an adaptive computing engine (ACE) to communicate with external devices. The external devices can comprise a separate system on chip (SOC) or can be other devices or resources such as audio/visual output devices, memory, network or other communications, etc. The IOC allows different modes of transfer and performs necessary translation of input and output commands.

In one embodiment, the IOC adheres to standard messaging and communication protocol used by other nodes in the ACE. This approach allows a uniform approach to the ACE design and provides advantages in scalability and adaptability of the ACE system.

One feature of the invention provides a physical link adapter for accommodating different external communication types such as, RS231, optical, Firewire, universal synchronous bus (USB), etc. The physical link adapter uses a reconfigurable finite state machine, selectable couplings and a bus switch to allow connection of different communication types' signals to a common ACE component such as to an IOC.

In one embodiment the invention provides a reconfigurable input/output controller (IOC), comprising at least one input for receiving a point-to-point transfer instruction; and at least one output for providing a translated point-to-point transfer instruction to an external device.

In another embodiment the invention provides a physical link adapter comprising a first configurable coupling to a first connector, wherein the first connector receives a first set of signals of a first communication type; a second configurable coupling to a second connector, wherein the second connector receives a second set of signals of a second communication type; and a controller for selectively applying an output of either the first or second configurable coupling to a common bus.

BRIEF DESCRIPTION OF THE DRAWINGS

FIG. 2 shows IOC signals relevant in performing port and address translations between;

FIGS. 3-44 illustrated data word formats;

DETAILED DESCRIPTION OF THE INVENTION

A preferred embodiment of the invention uses an adaptive computing engine (ACE) architecture including an input/output controller (IOC) node. Details of an exemplary ACE architecture are disclosed in U.S. patent application Ser. No. 09/815,122, entitled "Adaptive Integrated Circuitry with Heterogeneous and Reconfigurable Matrices of Diverse and Adaptive Computational Units having Fixed, Application Specific Computational Elements," referenced, above.

Figure 1:
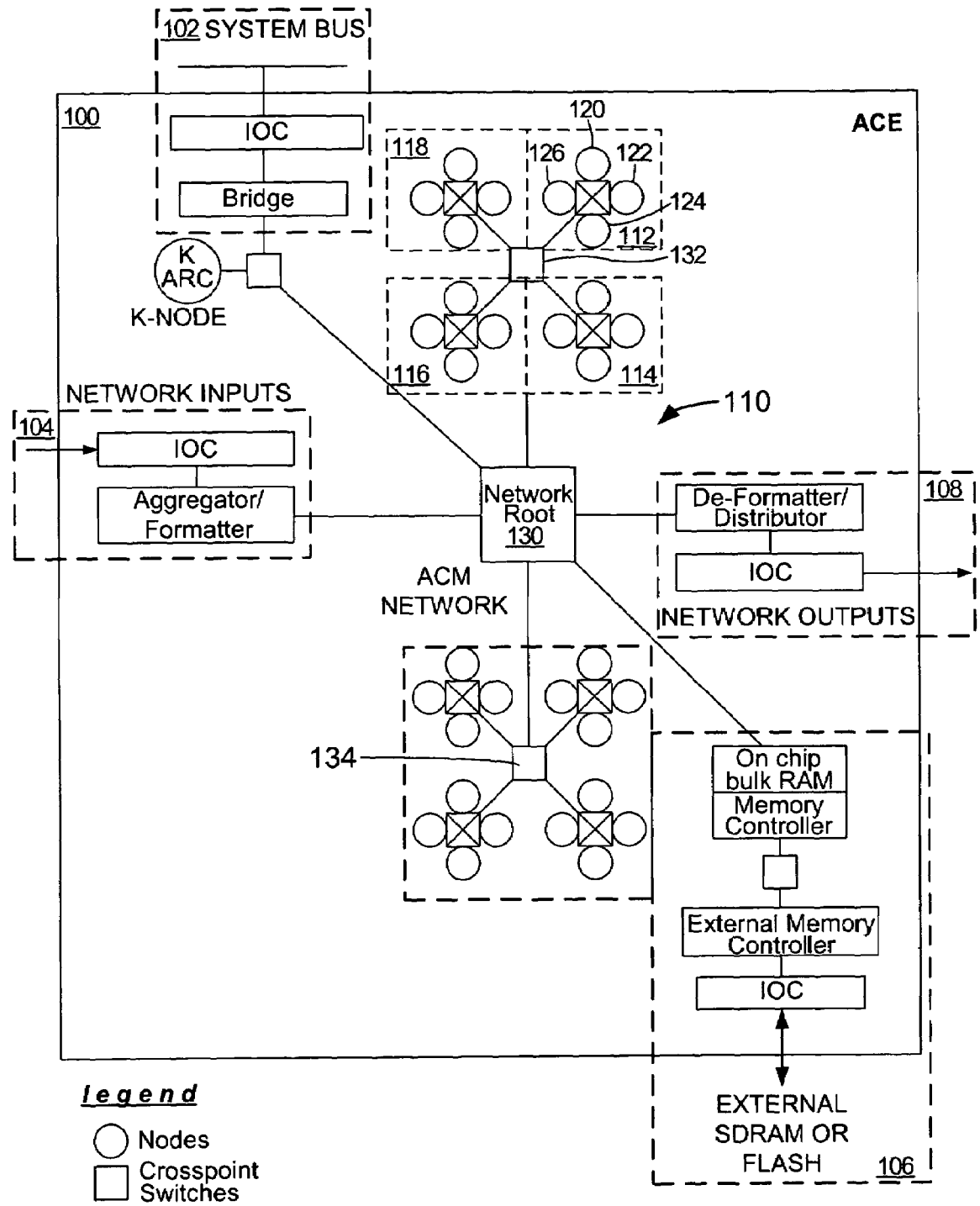
FIG. 1 illustrates an embodiment of an ACE device.

In general, the ACE architecture includes a plurality of heterogeneous computational elements coupled together via a programmable interconnection network. FIG. 1 illustrates an embodiment 100 of an ACE device. In this embodiment, the ACE device is realized on a single integrated circuit. A system bus interface 102 is provided for communication with external systems via an external system bus. A network input interface 104 is provided to send and receive real-time data. An external memory interface 106 is provided to enable the use of additional external memory devices, including SDRAM or flash memory devices. A network output interface 108 is provided for optionally communicating with additional ACE devices.

Each of the four bus and network interfaces includes a configurable input/output (I/O) node, or IOC. For example, interface 102 includes IOC 103; interface 104 includes IOC 105; interface 106 includes IOC 107; and interface 108 includes IOC 109. The IOCs facilitate communication with their associated network or bus. The IOCs can be configured for different types of communication. The IOCs also adhere to node control and communication protocol so that an ACE system that uses the IOCs can benefit from the advantages of an adaptable architecture such as in rapid reconfigurability, scaling, etc.

Note that FIG. 1 illustrates but one embodiment of an arrangement of IOC nodes and other components. Many variations are possible. For example, more or less IOC (or other) nodes can be used. The interconnection system among nodes can be changed. In general, other designs can vary in the number and type of components and functions that are employed or performed.

A plurality of heterogeneous computational elements (or nodes), including computing elements 120, 122, 124, and 126, comprise fixed and differing architectures corresponding to different algorithmic functions. Each node is specifically adapted to implement one of many different categories or types of functions, such as internal memory, logic and bit-level functions, arithmetic functions, control functions, and input and output functions. The quantity of nodes of differing types in an ACE device can vary according to the application requirements.

Since each node has an architecture adapted to its intended function, nodes can approach the algorithmic efficiency of ASIC devices. For example, a binary logical node may be especially suited for bit-manipulation operations such as, logical AND, OR, NOR, XOR operations, bit shifting, etc. An arithmetic node may be especially well suited for math operations such as addition, subtraction, multiplication, division, etc. Other types of nodes are possible that can be designed for optimal processing of specific types.

Programmable interconnection network ("PIN"—also referred to as a matrix interconnection network (MIN)) 110 enables communication among a plurality of nodes such as 120, 122, 124 and 126, and interfaces 102, 104, 106, and 108. The programmable interconnection network can be used to reconfigure the ACE device for a variety of different tasks. For example, changing the configuration of the interconnections between nodes can allow the same set of heterogeneous nodes to implement different functions, such as linear or non-linear algorithmic operations, finite state machine operations, memory operations, bit-level manipulations, fast-Fourier or discrete-cosine transformations, and many other high level processing functions for advanced computing, signal processing, and communications applications.

In one embodiment, programmable interconnection network 110 comprises a network root 130 and a plurality of crosspoint switches, including switches 132 and 134. In one embodiment, programmable interconnection network 110 is logically and/or physically arranged as a hierarchical tree to maximize distribution efficiency. In this embodiment, a number of nodes can be clustered together around a single crosspoint switch. The crosspoint switch is further connected with additional crosspoint switches, which facilitate communication between nodes in different clusters. For example, cluster 112, which comprises nodes 120, 122, 124, and 126, is connected with crosspoint switch 132 to enable communication with the nodes of clusters 114, 116, and 118. Crosspoint switch is further connected with additional crosspoint switches, for example crosspoint switch 134 via network root 130, to enable communication between any of the plurality of nodes in ACE device 100.

The programmable interconnection network 110, in addition to facilitating communications between nodes within ACE device 100, also enables communication with nodes within other ACE devices via network inputs and outputs interfaces 104 and 108, respectively, and with other components and resources through other interfaces such as 102 and 106. Other designs can have different interconnection schemes. In general, any acceptable bus, network, dedicated lines or other communication system or combination can function as an interconnection network suitable for use with the present invention.

In a preferred embodiment, the IOC provides translation of port numbers or addresses from an "internal" ACE address reference to an "external" system (i.e., external to an ACE chip or system) address reference. The internal ACE system addressing is referred to as PIN or matrix interconnection network (MIN) addressing. External systems can include other processing systems such as a host computer or one or more central processing units. External systems can also include other ACE systems, and subsystems such as storage, communication (e.g., network access), specialized processing (e.g., digital signal processing (DSP)) or other components and processes. The external system is referred to in general as a "system on a chip" (SOC).

The IOC supports several I/O services such as Peek/Poke, Memory Random access (MRA), Point to Point (PTP), Direct Memory Access (DMA), Messaging, and RTI (Real Time Input). In other embodiments, additional or different services can be supported.

ACM to SOC bound PTP and DMA traffic are supported by up to 32 ports with n-deep buffers per port. Buffer depths are programmable where n can equal 4, 8, 16, 32, 64, 128, 256, or 512. Separate buffer spaces exist for the in ports and out ports. Unused ports can be disabled. In a preferred embodiment, the sum of all enabled ports' buffer depths does not exceed 512.

The IOC clock and external interface runs at the MIN clock rate. The IOC provides status lines to the SOC indicating availability of input and output services thus allowing the SOC to prioritize and analyze multiple simultaneous services. Peek/Poke services are given a higher priority than MRA services. The IOC supports both Host (pull, e.g. processor) and Host less (push, e.g. memory) SOCs. Interrupts are provided for both SOC to ACM and ACM to SOC transfers.

Port-to-port and port-to-address translations are supported. Data address generation (DAG) is provided for point-to-point and DMA services. Application program interfaces (APIs) are provided to control the IOC from the SOC.

One of the capabilities of the IOC is the translation of a port identifier or address into an SOC address. A MIN transaction may carry an address or a port number that needs to be translated. Different types of translations are possible as shown in Table 1.

TABLE 1

Port/Address Translation

| Direction | Service | Port to Address | Port to Port | Address to Address |
|---|---|---|---|---|
| ACM to SOC | PTP | X | X | |
| ACM to SOC | DMA | X | X | |
| ACM to SOC | Peek/Poke | | | 28 bit address space with the upper 4 bits settable via ACOS API's |
| ACM to SOC | MRA | | | 28 bit address space with the upper 4 bits settable via ACOS API's |
| ACM to SOC | Messaging | | | Address to Control Line |
| SOC to ACM | PTP | | | |
| SOC to ACM | DMA | | | |
| SOC to ACM | RTI | | | |
| SOC to ACM | MRA | | | |
| SOC to ACM | Messaging | | | Control line to port |

DMA and PTP MIN transactions that are targeted at the SOC land at an IOC port and can be mapped onto an SOC port or onto an SOC address. When the DMA or PTP transaction is targeted at an SOC address (e.g., as set by a call to the IOC applications programming interface (API)), a port address translation table comes to bear with a DAG that is activated and generates an address based on one of the following DAG modes: 1. Same address; 2. Stride (1 or more); 3. Circular. The addressing modes of the IOC ports are setup for each port upon PTP or DMA port setup.

When an ACM to SOC-bound MRA Read/Write or Peek/Poke operation lands on the IOC, the address can be offset by 4 most significant bits if requested by a component in the SOC. For example, the request can be via an API.

When a ACM to SOC bound MRA Read or Peek operation results in an SOC response, the read data or the peek data goes into a buffer in order of reception. The SOC to keeps track of the responses from the SOC so the return value is rejoined with the original source information on its way back to the MIN. The IOC creates the appropriate MIN transaction that carries the return value to the source of the Peek or MRA Read.

There is no address or port translation from the SOC into the ACM. When the SOC is initiating an MRA transaction into the ACM, the explicit address is provided as part of the transaction on InData bus on the first cycle and the data is provided in the second cycle. All SOC initiated MRAs address the internal or external memories (IMC and XMC).

Some SOC originated Interrupt lines are connected to the ACM messaging protocol generating a message per control line transition. The SOC must recycle the line in order to generate a repeat message. The Message and destination are preset per line by the ACM.

RTI is a port-to-port transaction and is handled by the SOC as any other PTP via the APIs.

Figure 2:
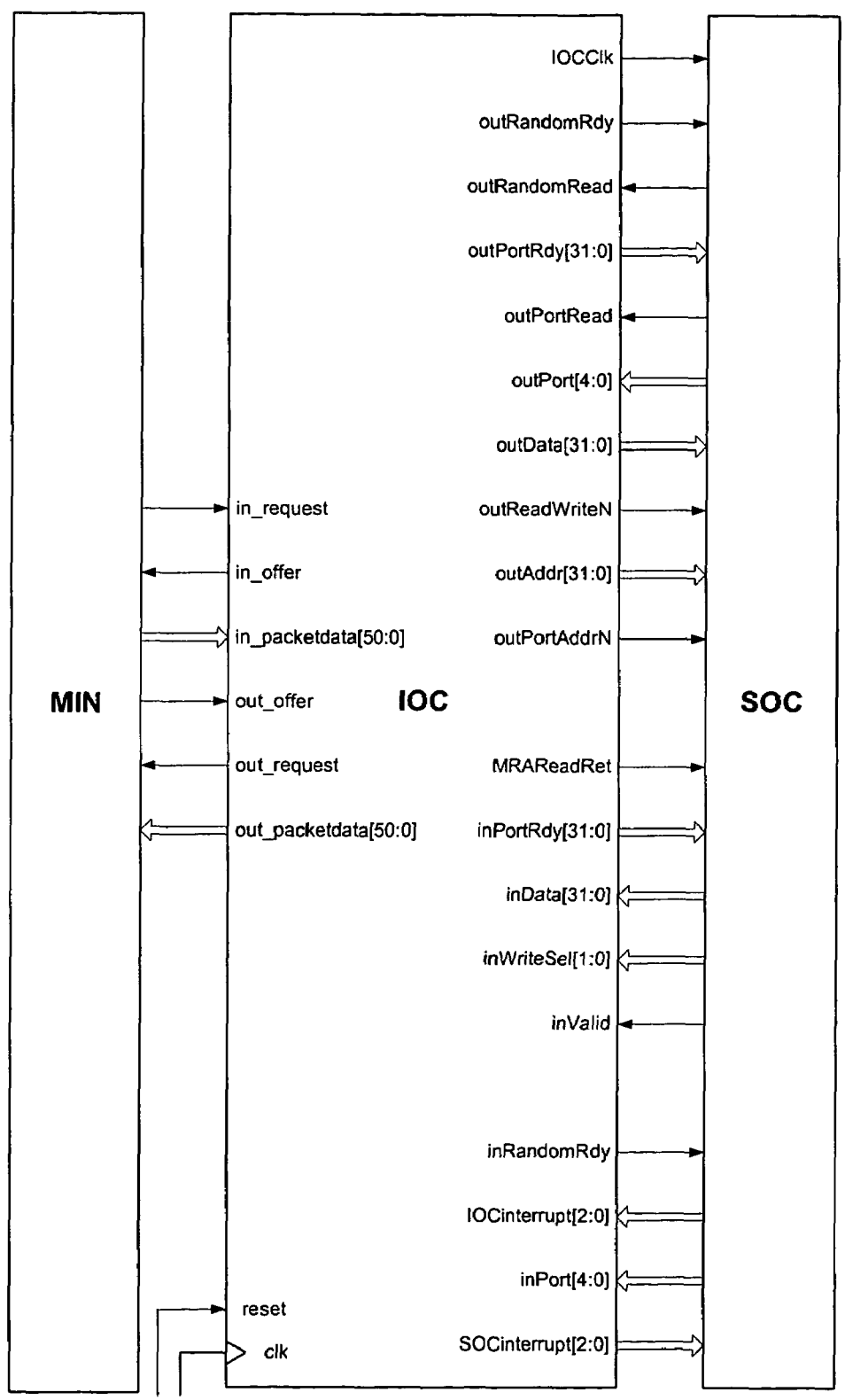
Figure 45:
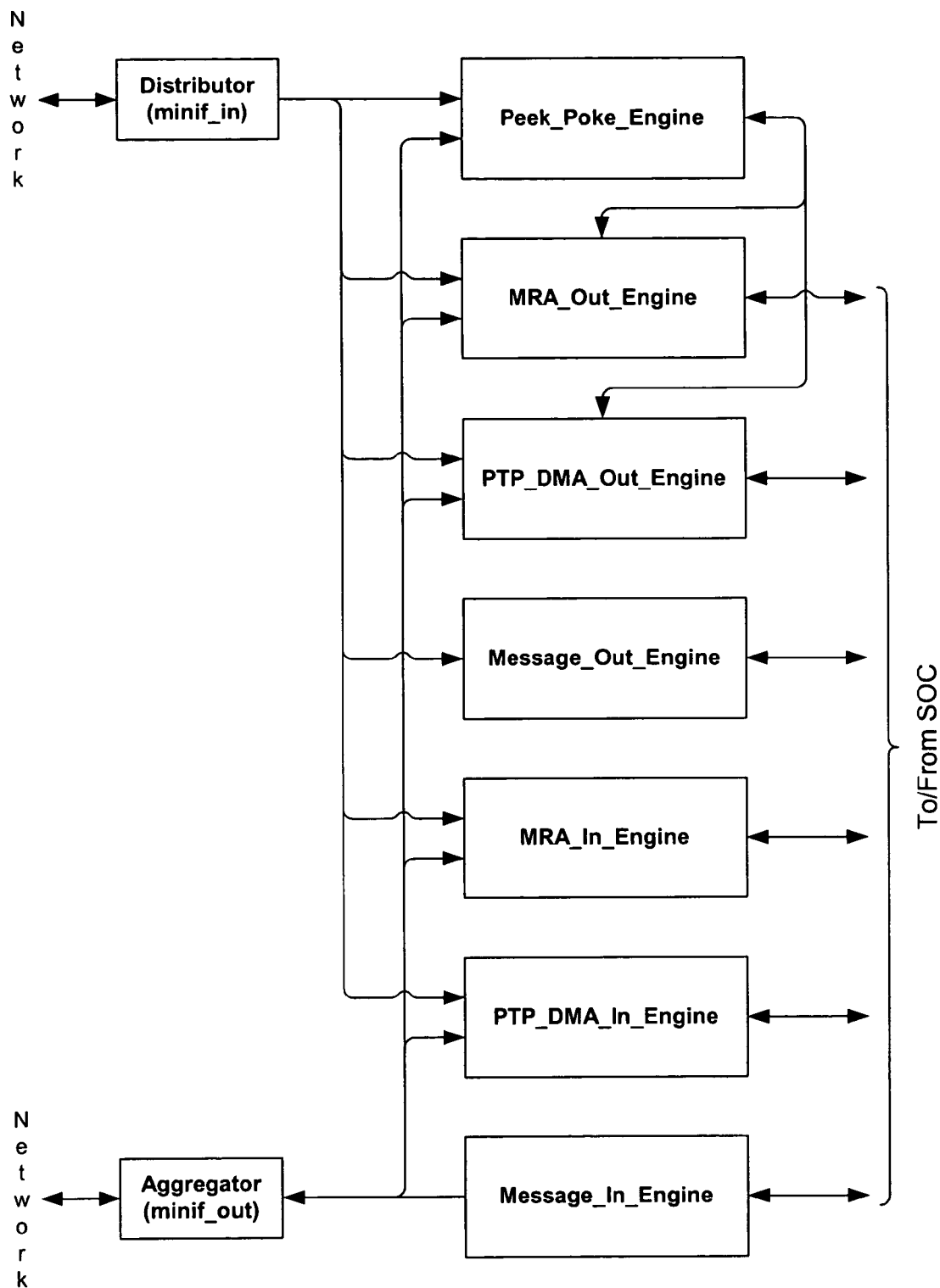
FIGS. 45-53 show signals of different components in the IOC.
Figure 46:
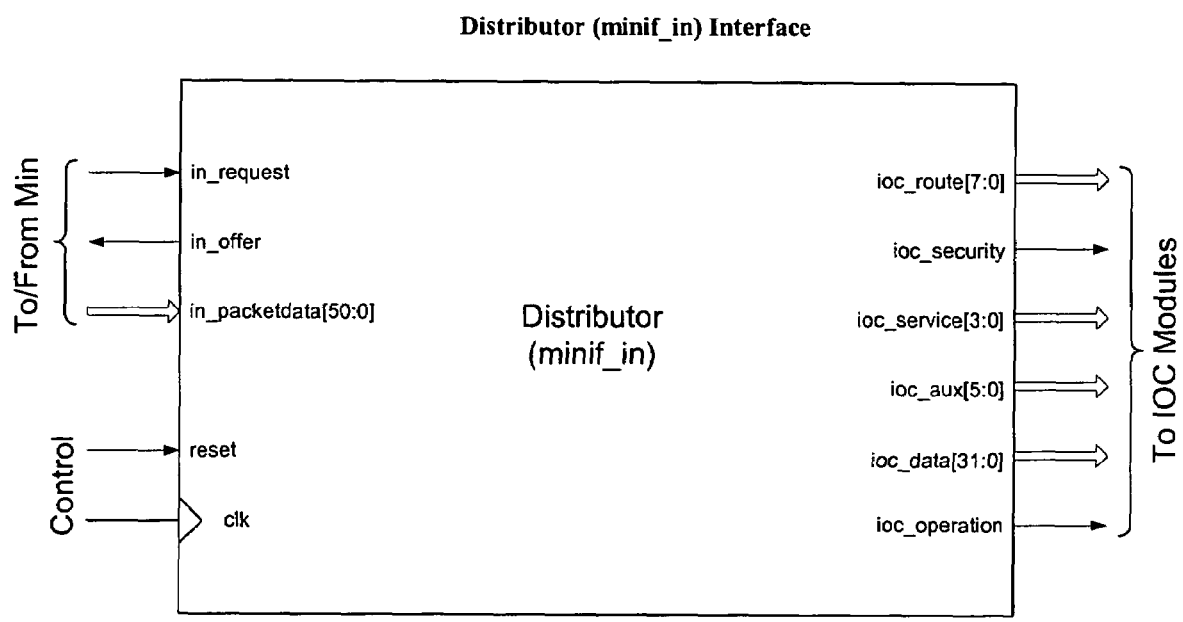
Figure 47:
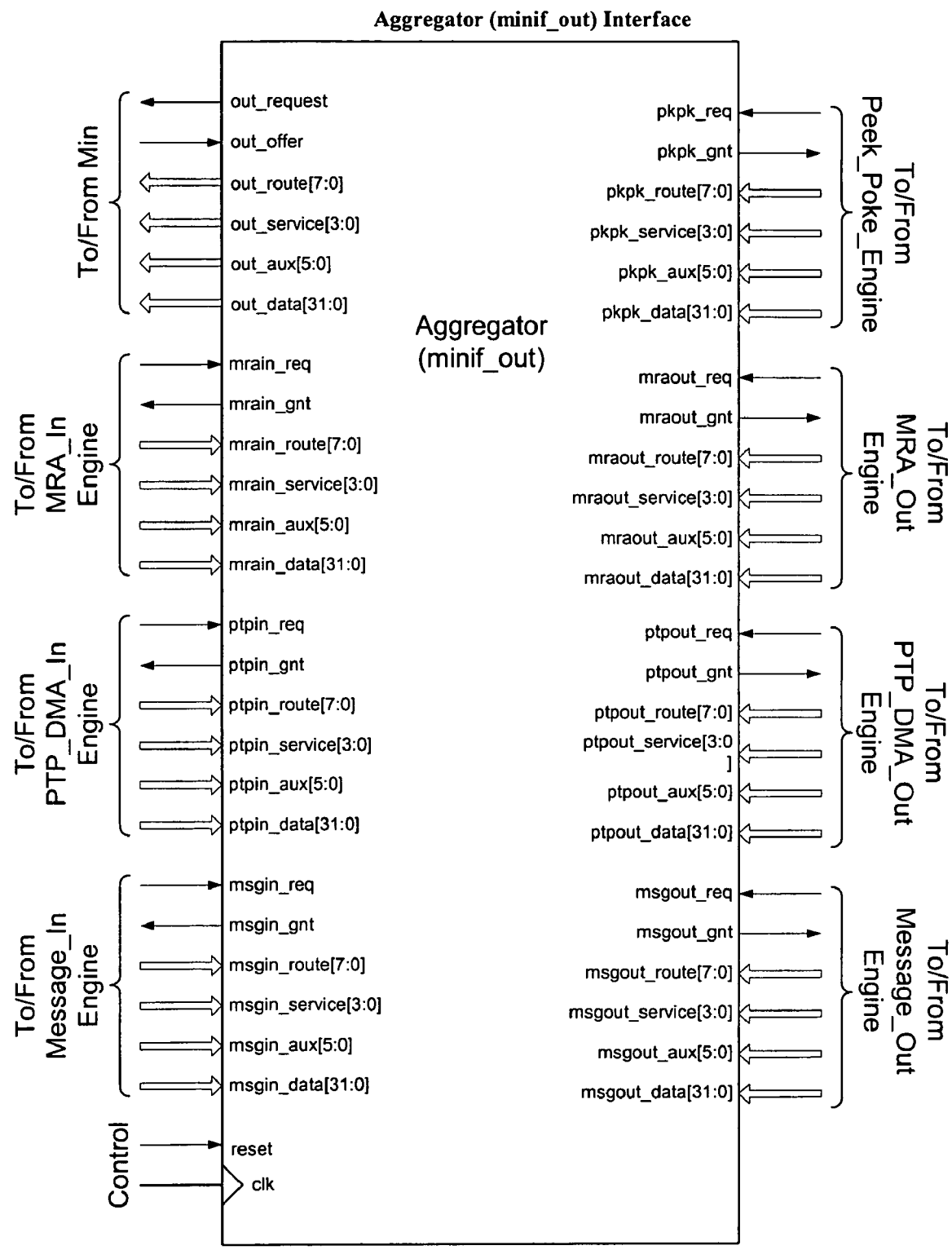
Figure 48:
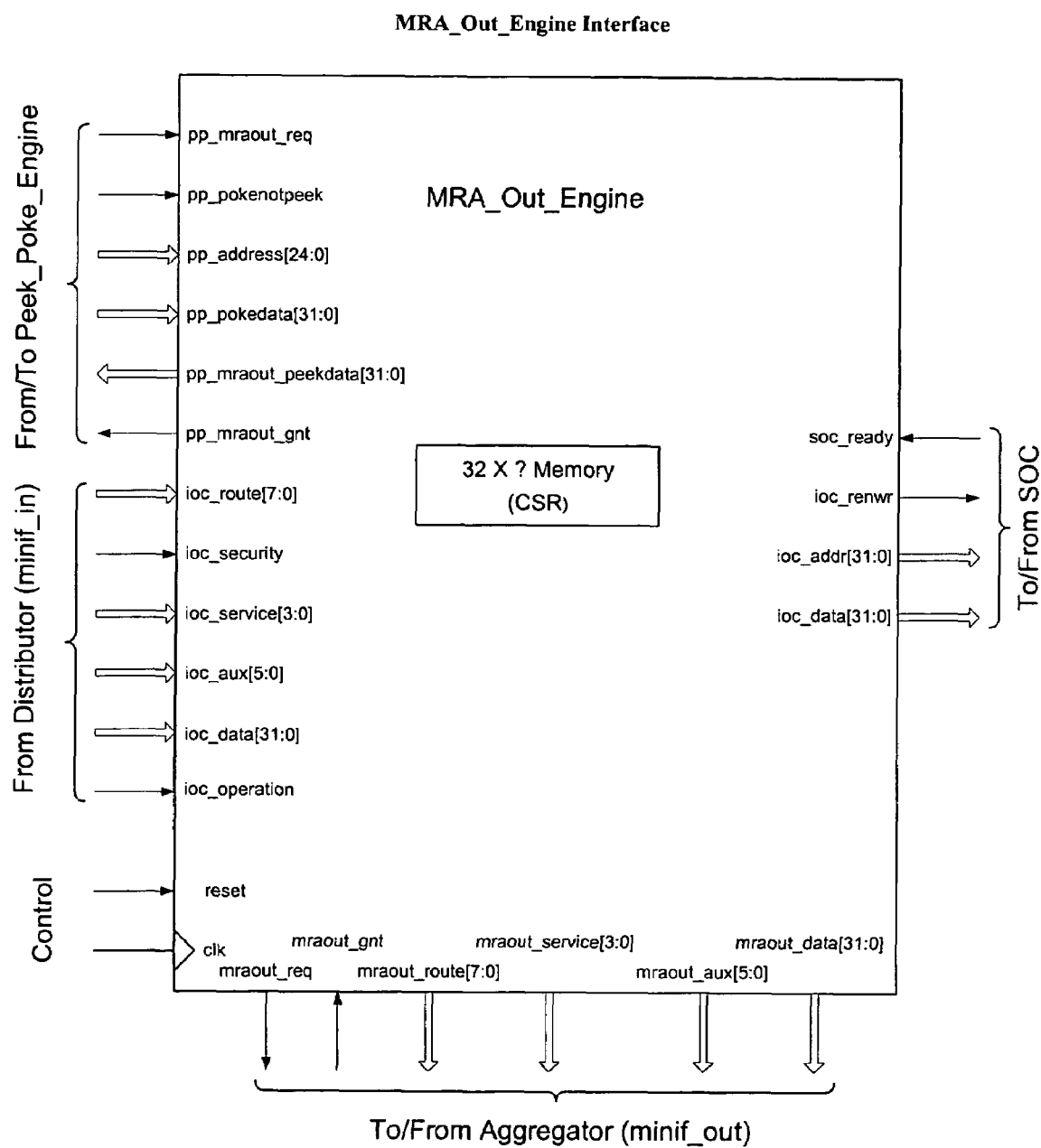
Figure 49:
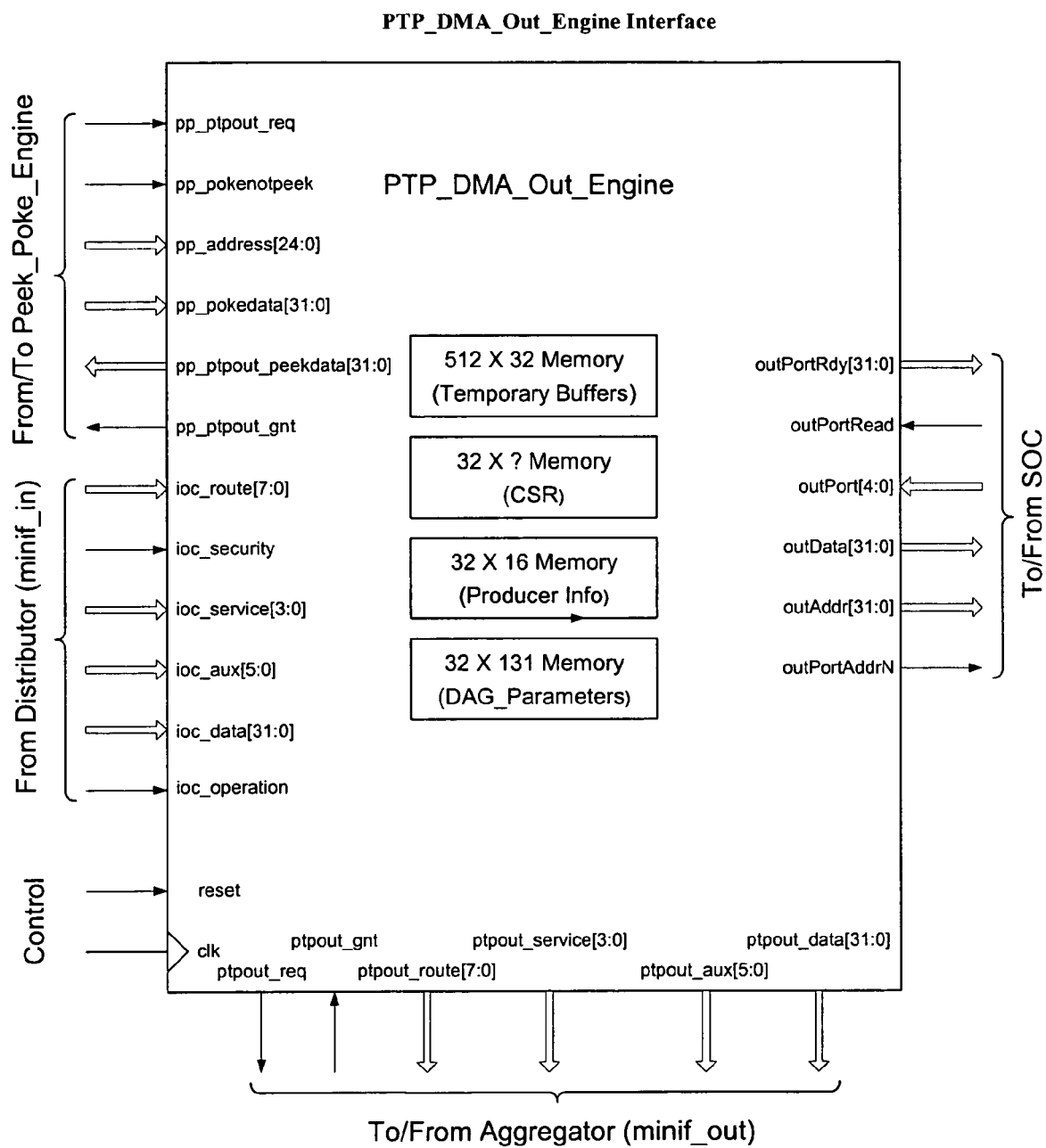
Figure 50:
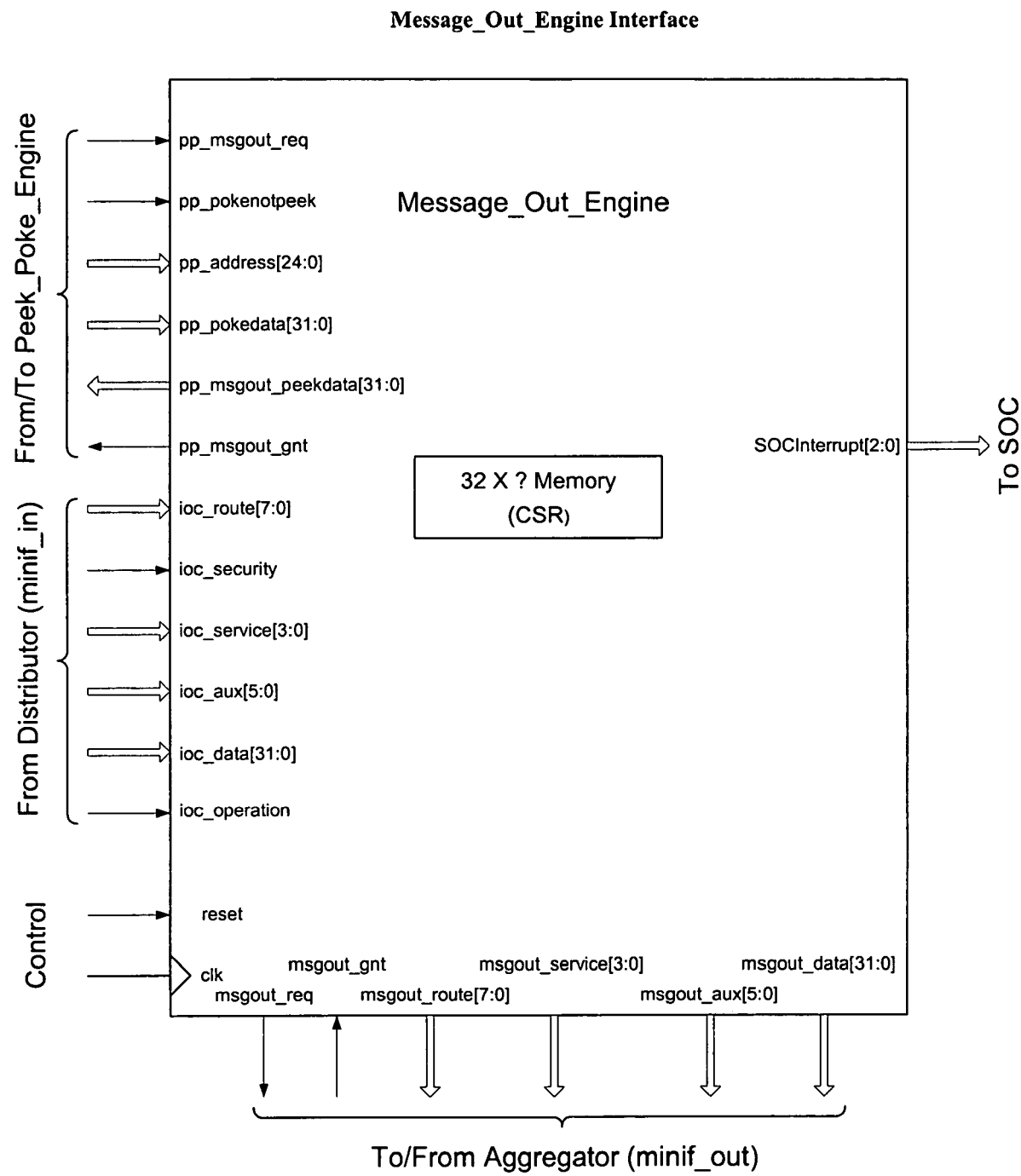
Figure 51:
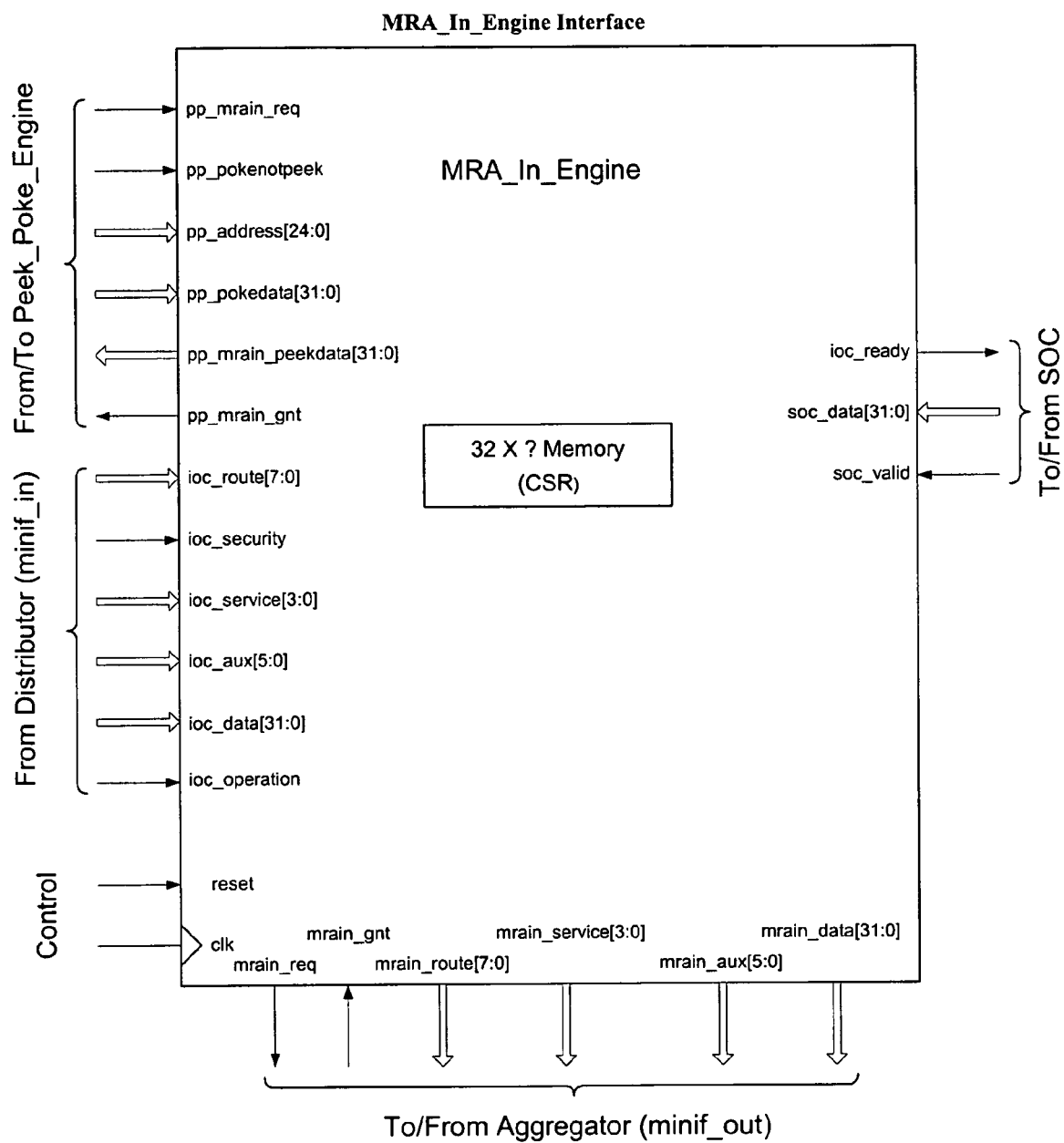
Figure 52:
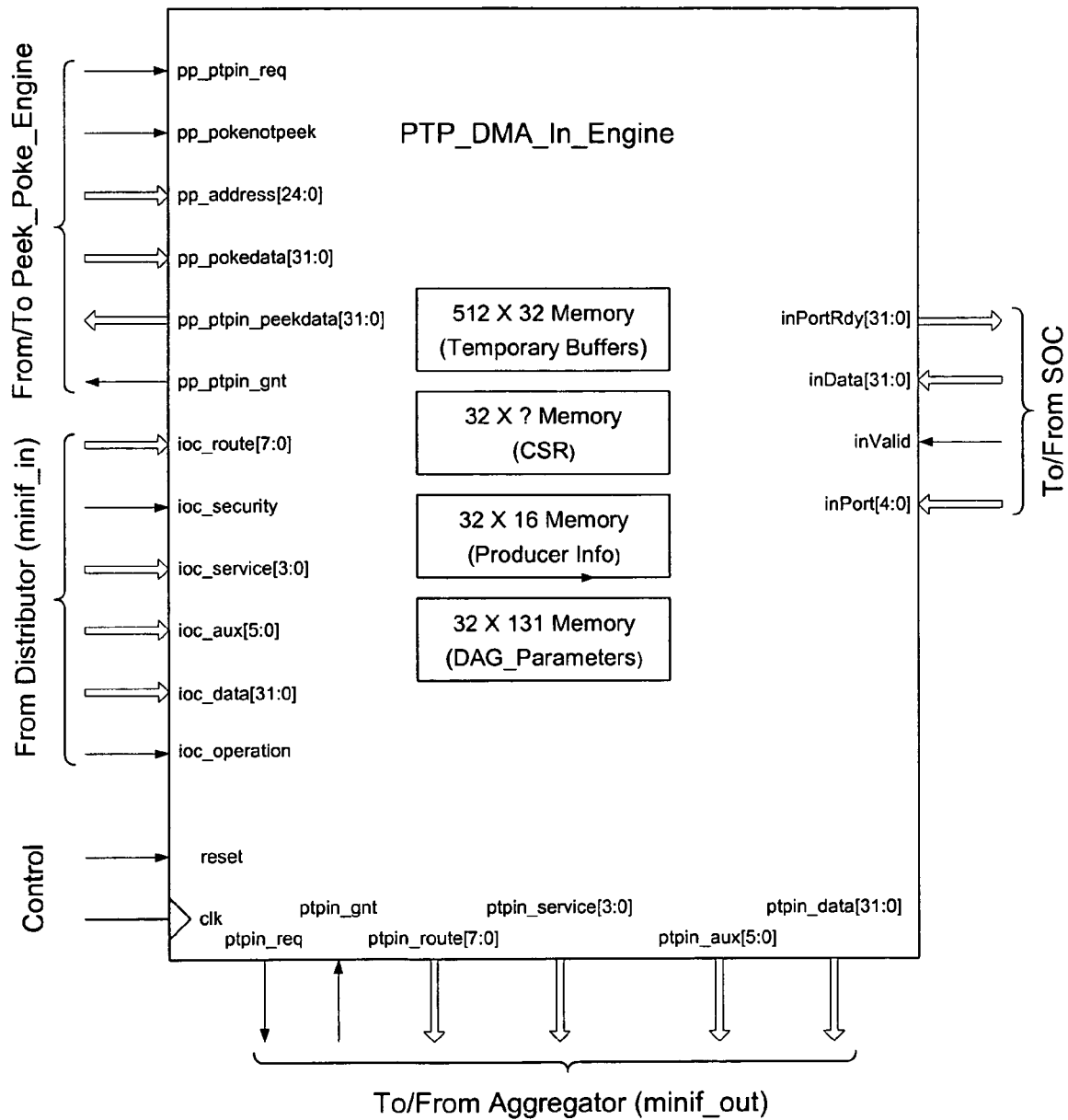
Figure 53:
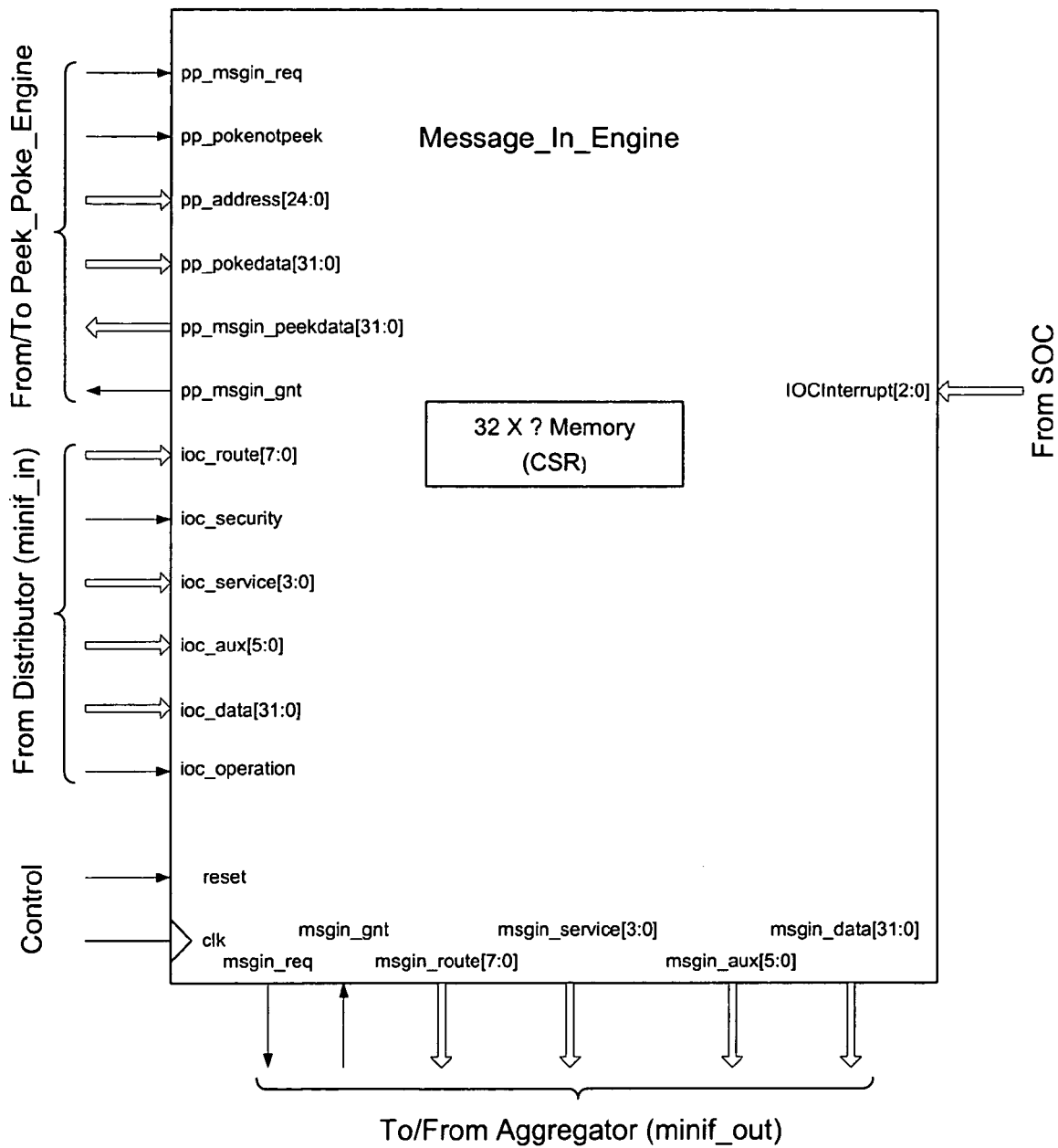

FIG. 2 shows IOC signals relevant in performing port and address translations between MIN and SOC.

Table 2 lists the control signals to the IOC.

TABLE 2

Control Signal Descriptions

| Signal Name | I/O | Description |
|---|---|---|
| Clk | CLK | System clock equal to the MIN clock |
| Reset | I | Synchronous system reset to the IOC |

Table 3 shows the signals at IOC-SOC interface. The interface runs at MIN speed synchronous to the MIN clock.

TABLE 1

IOC-SOC Signal Descriptions

| Signal Name | Transaction | I/O | Description |
|---|---|---|---|
| IOCClk | IOC to SOC | O | Synchronous to the MIN clock at the external interface |
| outRandomRdy | IOC to SOC | O | When asserted, data is available in the MRA/PEEK/POKE register for the SOC to read |
| outRandomRead | IOC to SOC | I | When asserted, the SOC is reading the MRA/Peek/Poke register |
| outPortRdy[31:0] | IOC to SOC | O | When OutPortRdy[n] is asserted, data is available in Port n; more than one bit may be asserted at the same time |
| outPortRead | IOC to SOC | I | When asserted, the SOC is reading the a port as selected by OutPort[4:0] |
| outPort[4:0] | IOC to SOC | I | When SOC is reading a port, these lines carry the port number selecting which port will presents its data on OutData(31:0) on the next clock |
| outData[31:0] | IOC to SOC | O | Data bus. When OutPortRead or OutRandomRead is asserted, data is placed on OutData(31:0) on the next clock |
| outReadWriteN | IOC to SOC | O | When High the current MRA is a Read, When Low Write |
| utAddr[31:0] | IOC to SOC | O | When the current transaction is targeted at an address, the address is placed on the OutAddr(31:0). |
| outPortAddrN | IOC to SOC | O | When High the current SOC transaction is directed at an SOC port. When Low, the OutAddr(31:0) carries address on the current cycle. |
| MRAReadRet | IOC to SOC | O | Indicates whether the MRA Write is a response to SOC initiated MRA Read |
| inPrtRdy[31:0] | SOC to IOC | O | Individual port ready signals driven by the PTP and DMA engines. When High indicate availability of consumer buffer space for the respective port. Once the last datum has been transferred from the SOC to the IOC port, the respective signal goes Low. |

TABLE 1-continued

IOC-SOC Signal Descriptions

| Signal Name | Transaction | I/O | Description |
| --- | --- | --- | --- |
| inData[31:0] | SOC to IOC | I | Data (PR Address) coming out of the SOC |
| inWriteSel[1:0] | SOC to IOC | I | Selects between: SOC initiated MRA Write, MRA Read, Port Write, and response to IOC Random Read (MRA Read or Peek). See table below for bit definitions.. |
| inValid | SOC to IOC | I | When asserted, valid transaction from the SOC on the active clock |
| inRandomRdy | SOC to IOC | O | When High, the IOC is ready to receive a random Write from the SOC on the next clock |
| IOCinterrupt[2:0] | SOC to IOC | I | Interrupt to IOC, edge triggered |
| SOCinterrupt[2:0] | IOC to SOC | O | Interrupt to SOC, 1 clock cycle duration pulse |
| inPort[4:0] | SOC to IOC | I | Data on the InData bus is directed at port indicated for SOC to IOC port write |

Table 4 shows the signals at the IOC/MIN interface.

TABLE 2

OC-MIN Signal Descriptions

| Signal Name | Transaction | I/O | Description |
| --- | --- | --- | --- |
| in_request | MIN to IOC | I | When asserted, the MIN is driving a valid request on in_packetdata |
| in_offer | MIN to IOC | O | When asserted, this signal indicates that the IOC is ready to accept an input request from the MIN |
| in_packetdata[50:0] | MIN to IOC | I | Actual data request to be transferred from MIN to IOC |
| out_request | IOC to MIN | O | When asserted, the IOC is driving a valid request on out_packetdata |
| out_offer | IOC to MIN | I | When asserted, this signal indicates that the MIN is ready to accept an input request from the IOC |
| out_packetdata[50:0] | IOC to MIN | O | Actual data request to be transferred from IOC to MIN |

Packet data fields (whether in or out) are generally passed around inside the IOC as outlined in Table 3.

TABLE 3

X_packetdata[50:0] fields

| Signal | Bitfield | Description |
| --- | --- | --- |
| X_route[7:0] | X_packetdata[50:43] | Routing information or node id |
| X_security | X_packetdata[42] | Security bit |
| X_serv[3:0] | X_packetdata[41:38] | Service type field |
| X_aux[5:0] | X_packetdata[37:32] | Auxiliary field (can be port number, encoding, or some other item as a function of X_serv |
| X_data[31:0] | X_packetdata[31:0] | Data field |

In a preferred embodiment, the IOC is event driven. Certain groups of events form transactions. A MIN-to-IOC transaction is triggered by the receipt of a MIN word at the IOC, and eventually gives rise to an IOC-to-SOC transaction.

A node may send data to the SOC via a Point-to-Point (PTP) channel established by the API between the node and any of the IOC's 32 out ports. To the sending node (producer), the IOC is indistinguishable from an ordinary node in the ACE system. Other embodiments may deviate from this standardized approach to IOC communication. The IOC processes forward acknowledgements (acks) sent by the producer and replies with a backward ack when the data is consumed (transferred to the SOC). Flow control is a byproduct of this forwards and backwards acking, and, as a consequence, an out-port's temporary buffer will never overflow as long as the producing node adheres to the PTP conventions. A more detailed description of flow control, and communication mechanisms is discussed in the related patent application entitled "Uniform Interface for a Functional Node in an Adaptive Computing Engine," referenced above.

Figures 3, 4, 5, 6, 7, 8, 9, 10, 11, 12:
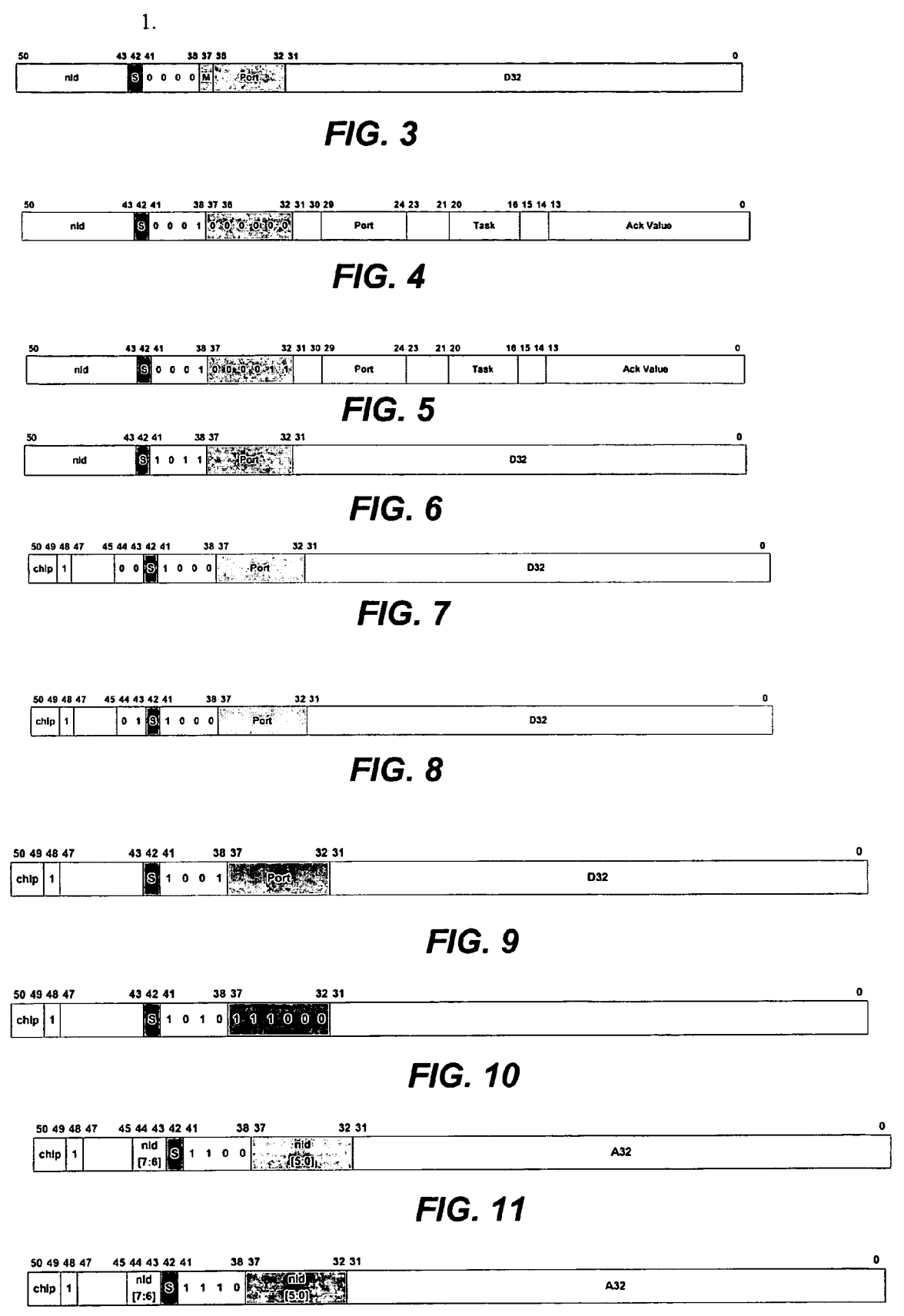

FIG. 3 shows a point-to-point (PTP) format. When a POINT-TO-POINT is received from the MIN for Port n the IOC writes the 32-bit data sequentially into Out-Port n's (circular) temporary buffer. The IOC then sets OutPortService[n] to PTP.

If the number of double words in the buffer is greater than or equal to OutPortThreshold[n], then the IOC asserts OutPortIOCReady[n]. OutPortThreshold[n], which is set by the API, may be 1, 2, 4, 8 or 16 double words; OutPortIOCReady[n] may be asserted for more than one port simultaneously.

FIG. 4 shows a PTP forward Ack format. When a forward ack is received from the MIN for Out-Port n, then if Out-Port n's temporary buffer is non-empty, the IOC asserts OutPortIOCReady[n].

FIG. 5 shows a backward Ack. When a backward ack is received from the MIN for In-Port n the IOC increments InPortProducerCount[n] by Ack Value (which is negative). If the new value of InPortProducerCount[n] is negative and the IOC is not stalled by the aggregator/MIN, then the IOC asserts InPortIOCReady[n].

Real-Time Input (RTI) words received by the IOC from the MIN are treated the same as Point-to-Point words except that there is no acking with the producing node.

FIG. 6 shows an RTI data word. When an RTI data word is received from the MIN for Port n, the 32-bit data is written sequentially into Out-Port n's (circular) temporary buffer and OutPortService[n] is set to RTI. If the number of double words in the buffer is greater than or equal to OutPortThreshold[n], then OutPortIOCReady[n] is asserted. OutPortThreshold[n], which is set by the API, may be 1, 2, 4, 8 or 16 double words. OutPortIOCReady[n] may be asserted for more than one port simultaneously.

Any of the IOC's 32 out ports can serve as the destination of a DMA channel set up by the K-Node/Host. FIG. 7 shows a DMA data word. When a DMA data word is received from the MIN for Port n, the 32-bit data is written sequentially into Out-Port n's (circular) temporary buffer. OutPortService[n] is set to DMA. If the number of double words in the buffer is greater than or equal to OutPortThreshold[n], then OutPortIOCReady[n] is asserted. OutPortThreshold[n], which is set by the API, may be 1, 2, 4, 8 or 16 double words. OutPortIOCReady[n] may be asserted for more than one port simultaneously.

FIG. 8 shows a DMA Last Word of Chunk. When a DMA Last Word of Chunk is received from the MIN for Out-Port n, the 32-bit data is written sequentially into Out-Port n's (circular) temporary buffer. OutPortService[n] is set to DMA and OutPortLastWordChunk[n] is set to 1. OutPortIOCReady[n] is asserted. OutPortIOCReady[n] may be asserted for more than one port simultaneously. When the temporary buffer is eventually drained via an IOC-to-SOC DMA Transaction, the IOC sends a DMA CHUNK ACKNOWLEDGEMENT to the producing node thereby enabling the transfer of more DMA data from the producer to the IOC.

FIG. 9 shows a DMA Last Word. When a DMA Last Word is received from the MIN for Out-Port n, the 32-bit data is written sequentially into Out-Port n's (circular) temporary buffer. OutPortService[n] is set to DMA and OutPortLastWord[n] is set to 1. OutPortIOCReady[n] is asserted. OutPortIOCReady[n] may be asserted for more than one port simultaneously.

FIG. 10 shows a DMA Chunk Acknowledgement. When a DMA Chunk Acknowledgement is received from the MIN from In-Port n, the IOC sets InPortProducerCount[n] to −InPortBlockSize[n]. If the IOC is not stalled by the aggregator/MIN, then the IOC asserts InPortIOCReady[n].

A node can read any (32-bit) location in the SOC address space through an MRA read (RANDOM READ) directed to the IOC. A node can write to any (32-bit) location in the SOC address space through a MRA write (RANDOM WRITE) directed to the IOC. Both types of requests are placed into a queue and serviced in the order received, with one exception: MRA requests that are converted peek/poke's have priority over ordinary MRA requests.

FIG. 11 shows a Random-Read Address. When a Random-Read address is received from the MIN When a RANDOM-READ ADDRESS is received from the MIN the address is placed in the 17×32 (132×2 for NS2) OutRandomAddressTable at a location determined by the requesting node's ID. A Random Read Request is placed in the OutRandomAccessQueue. OutRandomCSR.IOCReady is asserted. This MIN-to-IOC transaction is eventually followed by an IOC-to-SOC MRA-Read Transaction.

When a Random-Write Address (FIG. 13) is received from the MIN the address is placed in the 17×32 (132×32 for NS2) OutRandomAddressTable at a location determined by the requesting node's ID.

When a Random-Write Data (FIG. 14) is received from the MIN the data is placed in the OutRandomDataTable at a location determined by the requesting node's ID. A Random Write Request is placed in the OutRandomAccessQueue. OutRandomCSR.IOCReady is asserted. This MIN-to-IOC transaction is eventually followed by an IOC-to-SOC MRA-Write Transaction.

A peek or poke from a control node (referred to as a "K-Node") or Host can be directed at either an SOC location or an IOC register. A peek or poke of an SOC location is converted into a MRA read or write and h MRA Engine takes control. A peek or poke of an IOC register is serviced immediately by the Peek/Poke Engine, which sends an immediate response to the K-Node/Host.

Receipt of PEEK ADDRESS directed at the SOC

When a PEEK ADDRESS (FIG. 15) directed at the SOC is received from the MIN, then if the Security Bit (Bit 42) is not set, no action is taken. Otherwise, the address is placed in OutRandomPeekPokeAddress. OutRandomCSR.Requestor is set to Bit 32 of the PEEK ADDRESS word. H=0 indicates that the K-Node is the requestor. H=1 indicates that the Host is the requester. OutRandomCSR.Peek is asserted. OutRandomCSR.IOCReady is asserted. This MIN-to-IOC transaction is eventually followed by an IOC-to-SOC MRA-Read Transaction.

Figures 13, 14, 15, 16, 17, 18, 19, 20, 21, 22:
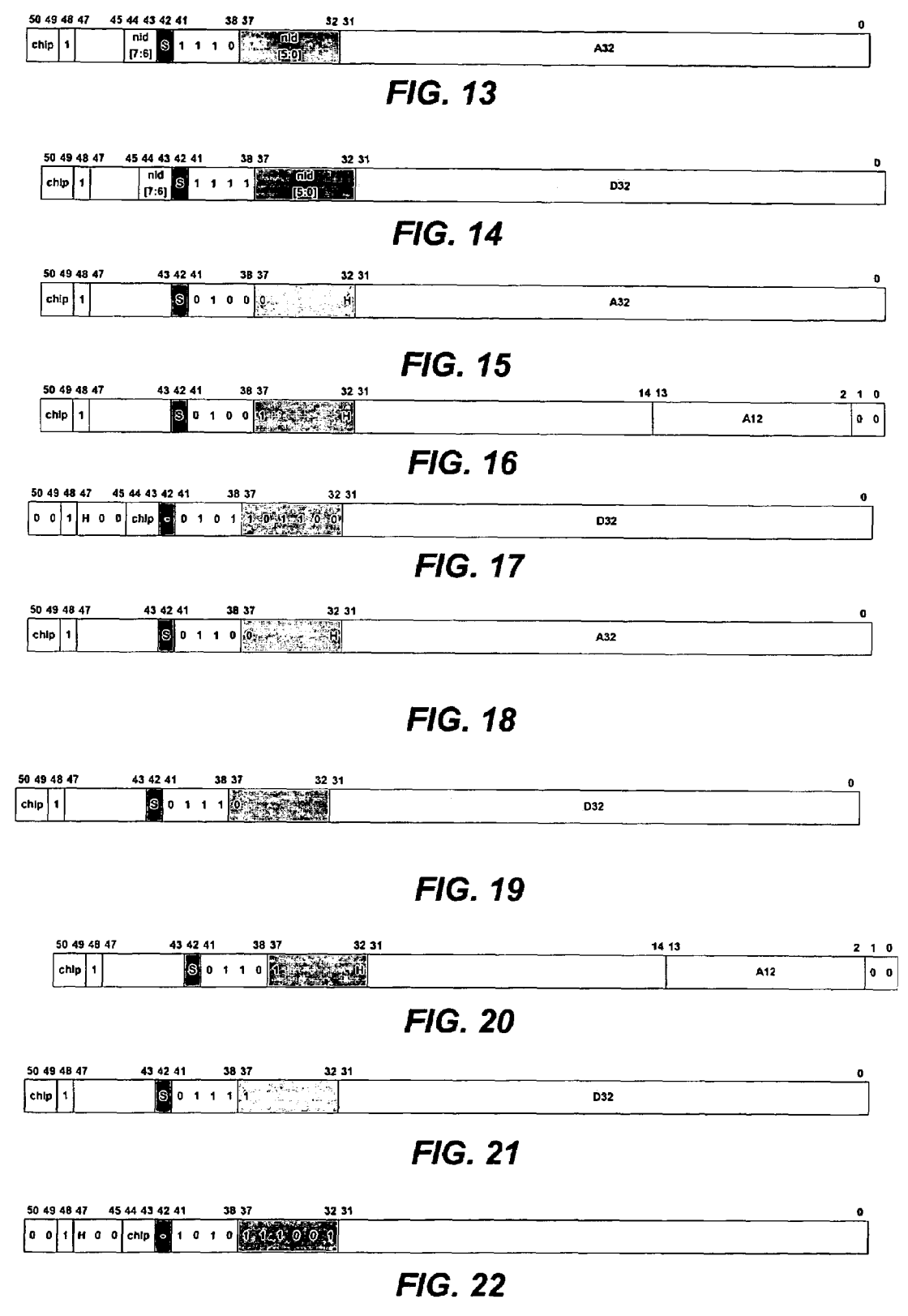

When a Peek Address (FIG. 16) directed at the IOC is received from the MIN then if the Security Bit (Bit 42) is not set, no action is taken. Otherwise, data is read from the indicated location and returned to the requesting node via a PEEK DATA (FIG. 17).

When a POKE ADDRESS (FIG. 18) directed at the SOC is received from the MIN, then if the Security Bit (Bit 42) is not set, no action is taken. Otherwise, the address is placed in OutRandomPeekPokeAddress. OutRandomCSR.Requestor is set to Bit 32 of the POKE ADDRESS word. Where H=0 indicates that the K-Node is the requester, and H=1 indicates that the Host is the requester.

When a Poke Data (FIG. 19) directed at the SOC is received by the MIN, then if the Security Bit (Bit 42) is not set, no action is taken. Otherwise, the data is placed in OutRandomPokeData and OutRandomCSR.Poke is asserted. OutRandomCSR.IOCReady is asserted. This MIN-to-IOC transaction is eventually followed by an IOC-to-SOC MRA-Write Transaction.

When a POKE ADDRESS (FIG. 20) directed at the IOC is received from the MIN, then if the Security Bit (Bit 42) is not set, no action is taken. Otherwise, the address is placed in IOCPokeAddress. PeekPokeCSR.Requestor is set to Bit 32 of the POKE ADDRESS word. H=0 indicates that the K-Node is the poker. H=1 indicates that the Host is the poker.

When a POKE DATA (FIG. 21) directed at the IOC is received from the MIN, then if the Security Bit (Bit 42) is not set, no action is taken. Otherwise, the 32-bit data is immediately written to the address contained in IOCPokeAddress. A POKE ACKNOWLEDGEMENT (FIG. 22) in which Bit 47 is set to PeekPokeCSR.Requestor is sent to the requestor (either K-Node or Host).

Figures 23, 24, 25, 26, 27, 28, 29, 30, 31:
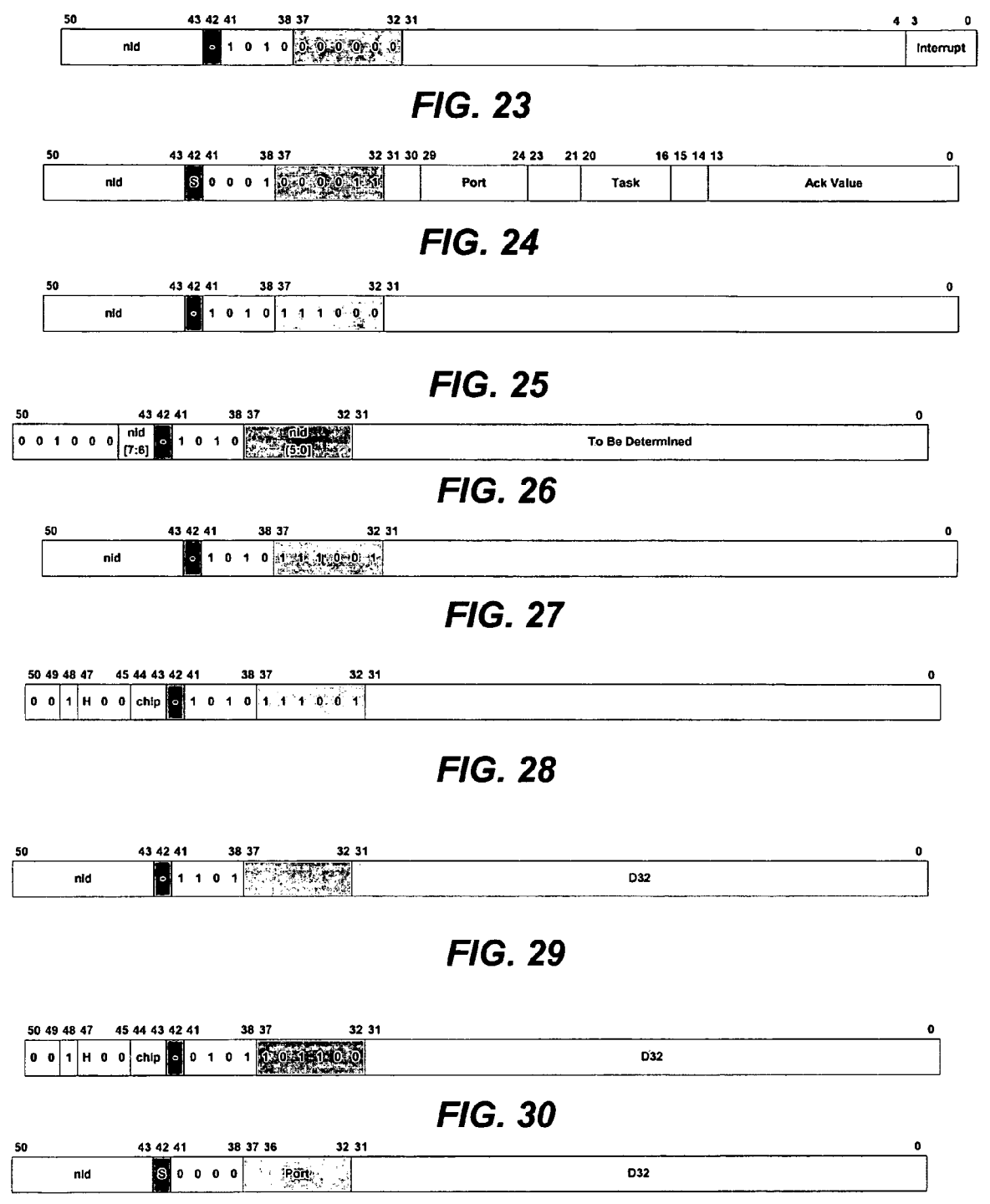

A node can interrupt the SOC to indicate status, provide flow control, signal exceptional events, and for other reasons. The node can cause the interrupt by, e.g., sending a message to the IOC with the interrupt type encoded in the low-order four bits of the payload field. When a MESSAGE (FIG. 23) is received from the MIN then the four low-order bits of the payload field are sent to the SOC via OutInterrupt[3:0].

IOC-to-SOC Transactions

IOC-to-SOC transactions are typically multi-cycle and are initiated by the IOC and directed at the SOC. For example, in an IOC-to-SOC PTP/RTI/DMA Transaction, following the assertion of OutPortIOCReady[n] by the IOC, the SOC eventually responds:

1. The SOC asserts OutPortSOCReady and sets OutPortSOC[4:0] to n.
2. On the next clock cycle, the IOC begins transferring data from Out-Port n's temporary buffer to the SOC via OutPortIOCData[31:0].

3. If OutPortSupplyAddr[n]=1, the IOC supplies an address to the SOC with each data word via OutPortIOCAddr[31:0]. The addresses are generated by the IOC Out-Port DAG configured with Port-n's DAG parameters. The IOC indicates to the SOC that an address is being supplied by asserting OutPortIOCAddrValid.
4. The transfer of data for Port n continues as long as three conditions hold: (1) OutPortIOCReady[n] is asserted, (2) OutPortSOCReady is asserted and (3) OutPortSOC=n.
5. The IOC can terminate transfer of Port-n data by de-asserting OutPortIOCReady[n]. This will occur when Port-n's temporary buffer has been completely drained. If OutPortService[n]=PTP, then upon the draining of Port-n's temporary buffer, the IOC sends a BACKWARD ACK (FIG. 24) to OutPortProducer[n] with an Ack Value equal to minus the number of data words transferred to the SOC since the last backward ack for Out-Port n. If OutPortService[n]=DMA and OutPortLastWordChunk[n]=1, then upon the draining of Port-n's temporary buffer, the IOC de-asserts OutPortLastWordChunk[n] and sends a DMA CHUNK ACKNOWLEDGEMENT (FIG. 25) to OutPortProducer[n]. If OutPortService[n]=DMA and OutPortLastWord[n]=1, then upon the draining of Port-n's temporary buffer, the IOC de-asserts OutPortLastWord[n] and sends a DMA DONE message (FIG. 26) to the K-Node with the IOC's ID in Route[1:0]+Aux[5:0]. (Note: If OutPortService[n]=RTI, no action is taken upon the draining of Port-n's temporary buffer.)
6. The SOC can terminate the transfer of Port-n data prior to the draining of Port-n's temporary buffer either by de-asserting OutPortSOCReady (in order to suspend the transfer of data) or by changing OutPortSOC to another port (to continue receiving data but from a different port).

The IOC services MRA Read and Write requests on a first-come-first-served basis, with one exception: a converted peek/poke is serviced before all other MRA requests.

When the IOC services an outbound MRA-Write request, it begins by signaling to the SOC that it has an MRA Write pending:

1. On the same clock cycle, the IOC: (a) asserts OutRandomCSR.IOCReady, (b) asserts OutRandomCSR.IOCWrite, (c) places the MRA data (retrieved from OutRandomDataTable or from OutRandomPokeData if OutRandomCSR.Poke is asserted) on OutRandomIOCData and (d) places the MRA address (retrieved from OutRandomDataTable or from OutRandomPeekPokeAddress if OutRandomCSR.Poke is asserted) on OutRandomIOCAddress.
2. The transfer of address and data from the IOC to the SOC occurs on any clock cycle in which OutRandomCSR.IOCReady, OutRandomCSR.IOCWrite and OutRandomSOCReady are all asserted.
3. Upon completion of the transaction, the IOC sends to the requesting node either a RANDOM-WRITE ACKNOWLEDGEMENT (FIG. 27) if OutRandomCSR.Poke=0 or a POKE ACKNOWLEDGEMENT (FIG. 28)—in which Bit 47 is set to OutRandomCSR.Requestor—if OutRandomCSR.Poke=1.

When the IOC services an outbound MRA-Read request, it begins by signaling to the SOC that it has an MRA Read pending:

1. On the same clock cycle, the IOC: (a) asserts OutRandomCSR.IOCReady, (b) de-asserts OutRandomCSR.IOCWrite, (c) places the MRA address (retrieved from OutRandomAddressTable or from OutRandomPeekPokeAddress if OutRandomCSR.Peek is asserted) on OutRandomIOCAddress.
2. The SOC indicates receipt of the read request by asserting OutRandomSOCReady.
3. The SOC eventually places the requested data on OutRandomSOCData[31:0] and asserts OutRandomSOCDataValid on the same clock cycle.
4. The IOC sends to the requesting node the returned data via either a RANDOM-READ DATA (FIG. 29) if OutRandomCSR.Peek=0 or a PEEK DATA (FIG. 30)—in which Bit 47 is set to OutRandomCSR.Requestor—if OutRandomCSR.Poke=1.

A node can interrupt the SOC—to indicate status, provide flow control, signal exceptional events, ... —by asserting one or more of the OutInterrupt lines for one clock cycle.

The IOC generates an interrupt to the SOC in response to a message received from the MIN:

1. When a message is received from the MIN, the IOC immediately sends the low-order four bits of the message payload to the SOC via OutInterrupt[3:0].
2. Upon completion of the one-cycle transfer, OutInterrupt returns to its default (quiescent) state in which all lines of OutInterrupt are de-asserted (unless, of course, the first interrupt is followed immediately by another interrupt).

A SOC-to-IOC PTP, RTI and DMA transaction is similar to the corresponding IOC-to-SOC transaction.

Figures 32, 33, 34, 35, 36, 37, 38, 39, 40:
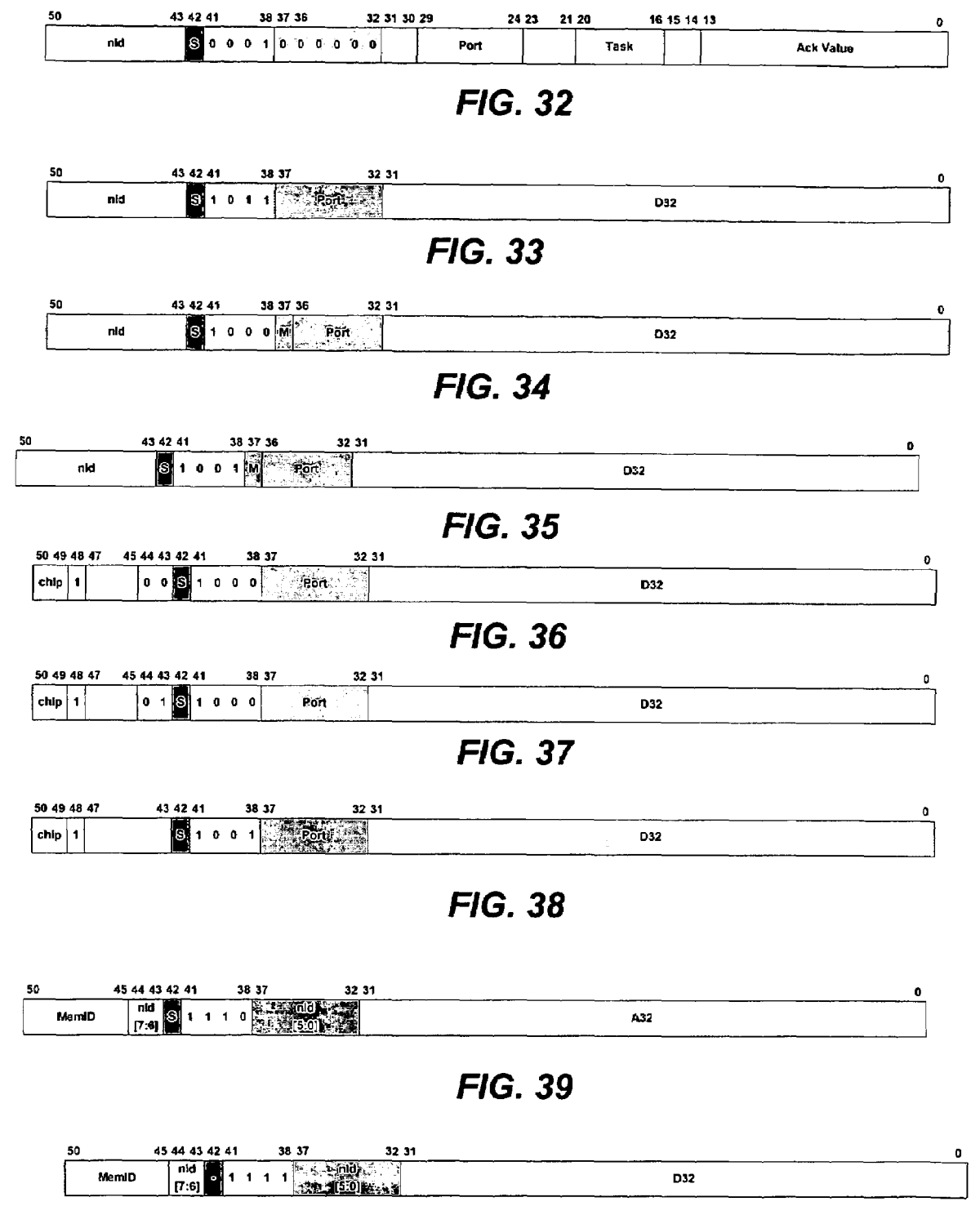

1. The IOC asserts InPortIOCReady[n] indicating that In-Port n is ready to receive data from the SOC.
2. The SOC sets InPortSOC to n—indicating that it wishes to transfer data on In-Port N—and asserts InPortSOCReady.
3. On the next clock cycle after InPortIOCReady[n] and InPortSOCReady are both asserted, the SOC begins transferring data to the IOC via InPortSOCData[31:0].
4. The transfer of data for In-Port n continues as long as three conditions hold: (a) InPortIOCReady[n] is asserted, (b) InPortSOCReady is asserted and (c) InPortSOC=n.
5. If InPortService[n]=PTP: On each clock cycle in which the three conditions in Step 4 hold, the IOC increments InPortProducerCount[n] by 1 and de-asserts InPortIOCReady[n] if the new value of InPortProducerCount[n] is non-negative or if the IOC is stalled by the aggregator/MIN. Upon receipt of each data word from the SOC, the IOC sends a POINT-TO-POINT DATA word (FIG. 31) to InPortConsumer[n]. The IOC also decrements InPortCountRemaining[n] by 1, and if InPortCountRemaining[n] is now non-positive, then the IOC sets InPortCountRemaining[n] to InPortBlockSize[n] (which is positive) and sends a FORWARD ACK (FIG. 32) to InPortConsumer[n] with an Ack Value equal to InPortBlockSize [n].
6. If InPortService[n]=RTI: The IOC responds to each SOC data word transfer as described for InPortService[n]=PTP, but with two exceptions: (a) Instead of sending a POINT-TO-POINT DATA word to InPortConsumer[n], the IOC sends a RTI DATA word (FIG. 33) (b) The IOC does not inhibit the transfer of RTI data, even when InPortProducerCount[n] is non-negative. (The IOC does, however, send forward acks as described for InPortService[n]=PTP.)
7. If InPortService[n]=DMA and InPortConsumer[n] is an ordinary node (nid[5]=0): Upon receipt of each data word from the SOC, the IOC sends a DMA DATA word (FIG. 34) to InPortConsumer[n] when InPortSOCLast- Word is de-asserted, and a DMA LAST WORD (FIG. 35) when InPortSOCLastWord is asserted.

If InPortService[n]=DMA and InPortConsumer[n] is a root resource (nid[5]=1): On each clock cycle in which the three conditions in Step 4 hold, the IOC increments InPortProducerCount[n] by 1 and de-asserts InPortIOCReady[n] if the new value of InPortProducerCount[n] is non-negative or if the IOC is stalled by the aggregator/MIN. (InPortProducerCount[n] will become negative again when a DMA CHUNK ACKNOWLEDGEMENT is received from InPortConsumer[n]. See Section Error! Reference source not found.) Upon receipt of each data word from the SOC, the IOC takes one of three actions: (a) If InPortSOCLastWord is de-asserted and InPortProducerCount[n] is negative, then the IOC sends a DMA DATA word (FIG. 36) to InPortConsumer[n]. (b) If InPortSOCLastWord is de-asserted and InPortProducerCount[n] is non-negative, then the IOC sends a DMA LAST WORD OF CHUNK (FIG. 37) to InPortConsumer[n]. (c) If InPortSOCLastWord is asserted, then the IOC sends a DMA LAST WORD (FIG. 38) to InPortConsumer[n] and sets InPortProducerCount[n] to −InPortBlockSize[n].

The SOC can initiate MRA Read and Write requests destined for the Internal Memory Controller (IMC), the External Memory Controller (XMC) or another IOC. Like an outbound MRA request, and inbound MRA request supplies an explicit address.

To provide MRA flow control, the IOC emulates the Node Wrapper: When the IOC's sends "random access write data" (service code 1×F) to memory, the IOC sets a "rawd" flow control flip flop to stall the IOC if it attempts to send another "rara (random-access read address), rawa (random-access write address), or rawd (random-access write data)" request (service codes 0xC, 0xE and 0xF) to memory before the memory sends the following message to the IOC indicating that the memory operation has been completed:
routing field: appropriate node;
service field: 0xA;
aux field: 0x39;

SOC-to-IOC MRA-Write Transaction

An inbound MRA Write is initiated by the SOC:
1. On the same clock cycle, the SOC: (a) asserts InRandomSOCReady, (b) asserts InRandomSOCWrite, (c) presents the MRA payload on InRandomSOCPayload, (d) indicates whether the payload is address or data by setting InRandomSOCData to 0 or 1, respectively and (e) provides the upper 6 bits of the destination-memory's ID in InRandomSOCMemID.
2. The IOC asserts InRandomCSR.IOCReady when the rawd bit is de-asserted (see above) and the previous inbound MRA request has been serviced.
3. The transfer of the payload—containing either address or data—and memory ID from the SOC to the IOC occurs on any clock cycle in which InRandomSOCReady, InRandomSOCWrite and InRandomCSR.IOCReady are all asserted.
4. When the IOC receives the payload and memory ID from the SOC, it uses InRandomSOCData to determine its action. If InRandomSOCData=0, then the IOC assembles the 32-bit payload, 6-bit memory ID and 8-bit IOC ID into a RANDOM-WRITE ADDRESS word (FIG. 39) which it passes to the MIN. If InRandomSOCData=1, then the IOC immediately de-asserts InRandomCSR.IOCReady, sets the rawd bit and assembles the 32-bit payload, 6-bit memory ID and 8-bit IOC ID into a RANDOM-WRITE DATA word (FIG. 40) which it passes to the MIN. When the IOC subsequently receives a RANDOM-WRITE ACKNOWLEDGEMENT (FIG. 41) from the MIN, it resets the rawd bit and asserts InRandomCSR.IOCReady, thereby enabling additional inbound MRA transactions.

SOC-to-IOC MRA-Read Transaction

An inbound MRA Read is initiated by the SOC:
1. On the same clock cycle, the SOC: (a) asserts InRandomSOCReady, (b) de-asserts InRandomSOCWrite, (c) de-asserts InRandomSOCData, (d) presents the read address on InRandomSOCPayload and (e) provides the upper 6 bits of the destination-memory's ID in InRandomSOCMemID.
2. The IOC asserts InRandomCSR.IOCReady when the rawd bit is de-asserted (see above) and the previous inbound MRA request has been serviced.
3. The transfer of the read address and memory ID from the SOC to the IOC occurs on any clock cycle in which InRandomSOCReady and InRandomCSR.IOCReady are asserted and InRandomSOCData is de-asserted.
4. Upon receiving the read address and memory ID from the SOC, the IOC assembles the 32-bit read address, 6-bit memory ID and 8-bit IOC ID into a RANDOM-READ ADDRESS word (FIG. 42) which it passes to the MIN. When the IOC subsequently receives a RANDOM-READ-DATA (FIG. 43) from the MIN, it passes the data to the SOC by placing the read data on InRandomIOCData and asserting InRandomCSR.IOCDataValid for one clock cycle.

SOC-to-IOC Interrupt

The SOC can interrupt the IOC—to indicate status, provide flow control, signal exceptional events, . . . —by asserting one or more of the InInterrupt lines for exactly one clock cycle. The IOC responds by sending a message to a predetermined destination (set via an ACOS API).

SOC-to-IOC Interrupt Transaction

These are the steps in an SOC-to-IOC Interrupt Transaction:
1. Whenever InInterrupt assumes any state other than the default/quiescent state—in which all lines are de-asserted—the IOC places the four InInterrupt bits into a 15-stage FIFO.
2. As capacity becomes available on the IOC aggregator, the IOC removes each four-bit interrupt word from the FIFO and sends a MESSAGE word (FIG. 44) to InterruptDestination[7:0] with the four-bit interrupt word stored in the low-order four bits of the message payload.

IOC ARCHITECTURE

The IOC is made of two sections: Input section and Output section. The sections are inter-related by virtue of signals that cross from output to input.

The output section receives transactions from the MIN and executes the services required. The input section reacts to external input based on its predetermined setup and generates the appropriate MIN transactions.

Figure 54:
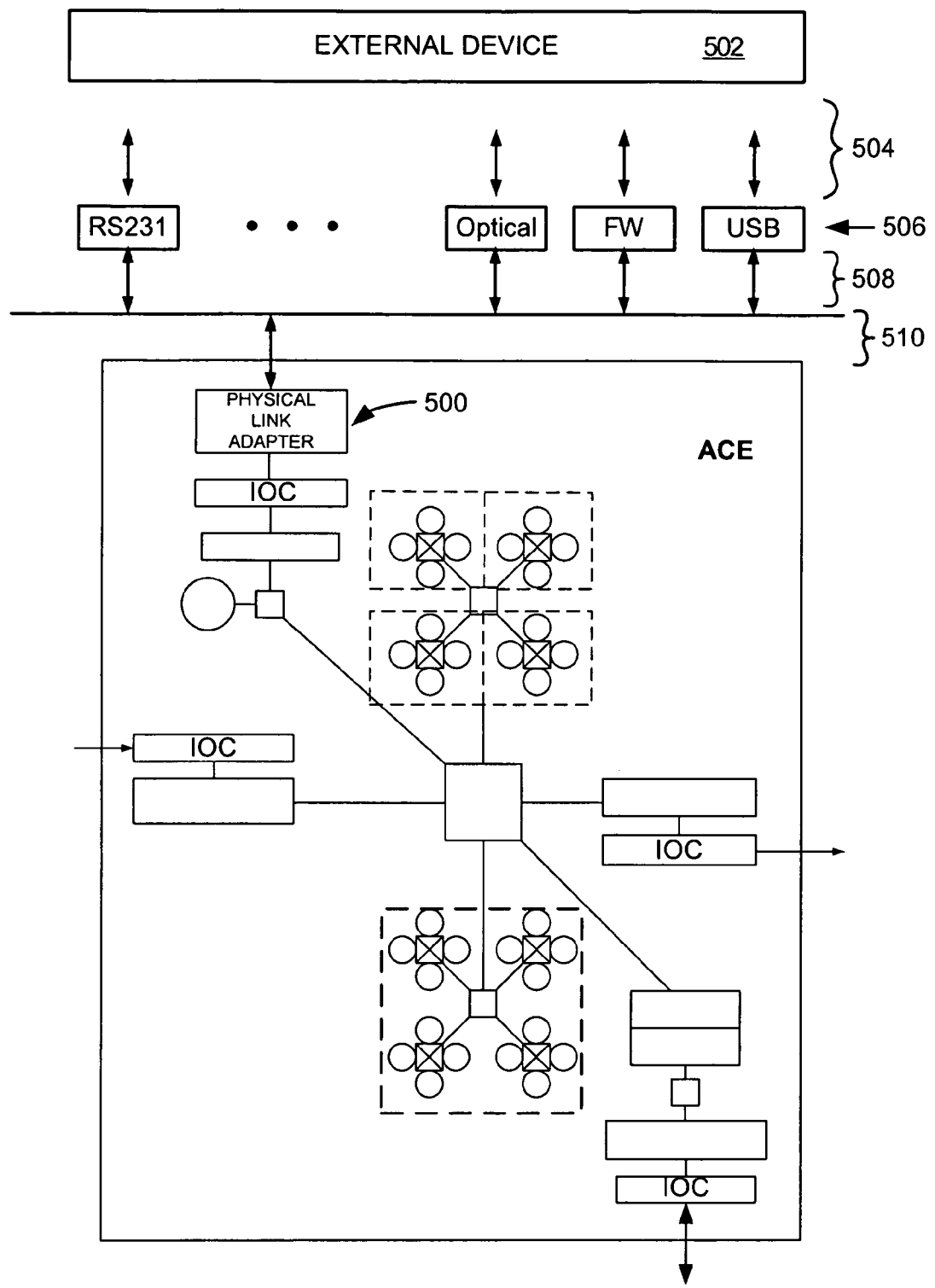
FIG. 54 illustrates a physical link adapter used with an adaptable computing engine.

The IOC consists of the following sub-systems:
Input Distributor (or minif_in)
Output Aggregator (or minif_out)
Peek_Poke Engine
   IOC internal CSR Peek_Poke handling
MRA_Out Engine
PTP_DMA_Out Engine Output PTP Engine
Output DMA Engine
Output Port translation Table
Message_Out Engine
MRA_In Engine
PTP_DMA_In Engine
Input PTP Engine
Input DMA Engine
Message_In Engine Physical Link Adapter FIG. 54 illustrates physical link adapter 500 used to accept multiple different network, bus or other communication links and provide a uniform bus interface to an ACE component such as an IOC, discussed above. In a preferred embodiment, the functions of the physical link adapter can be included in the ACE system and several of the functions are specifically included in, or associated with, the IOC.

One problem with today's electronics systems and devices is the use of many different communication links with different protocols, signals, connectors and line types. For example, an external device such as 502 can use an RS231 interface, optical (i.e., fiber optic) link, firewire, universal synchronous bus (USB), or other type of communication. Each of these communication types can use a different number of hardwire lines with different signals and signal requirements. In the case of wireless or optical links, different protocols and electrical or optical characteristics may be involved.

One embodiment of the invention provides for different communication types to be accommodated by providing different physical connectors such as at 506 for receiving different line connections 504. Note that the number and type of physical connections can be determined prior to manufacture so that, for example, the physical link adapter can configure one or a few (i.e., a subset) of the total possible communication types that are possible.

Connectors at 506 are connected to configurable bus 510 by coupling circuitry at 508. The coupling circuitry is under the control of the physical link adapter and provides for selective coupling and customized interfacing of the signals at the connectors onto configurable bus 510. Physical link adapter 500 receives the signals from configurable bus 510 and provides the signals to the ACE system as, for example, shown in FIG. 54 where the signals are provided via an IOC.

Figure 55:
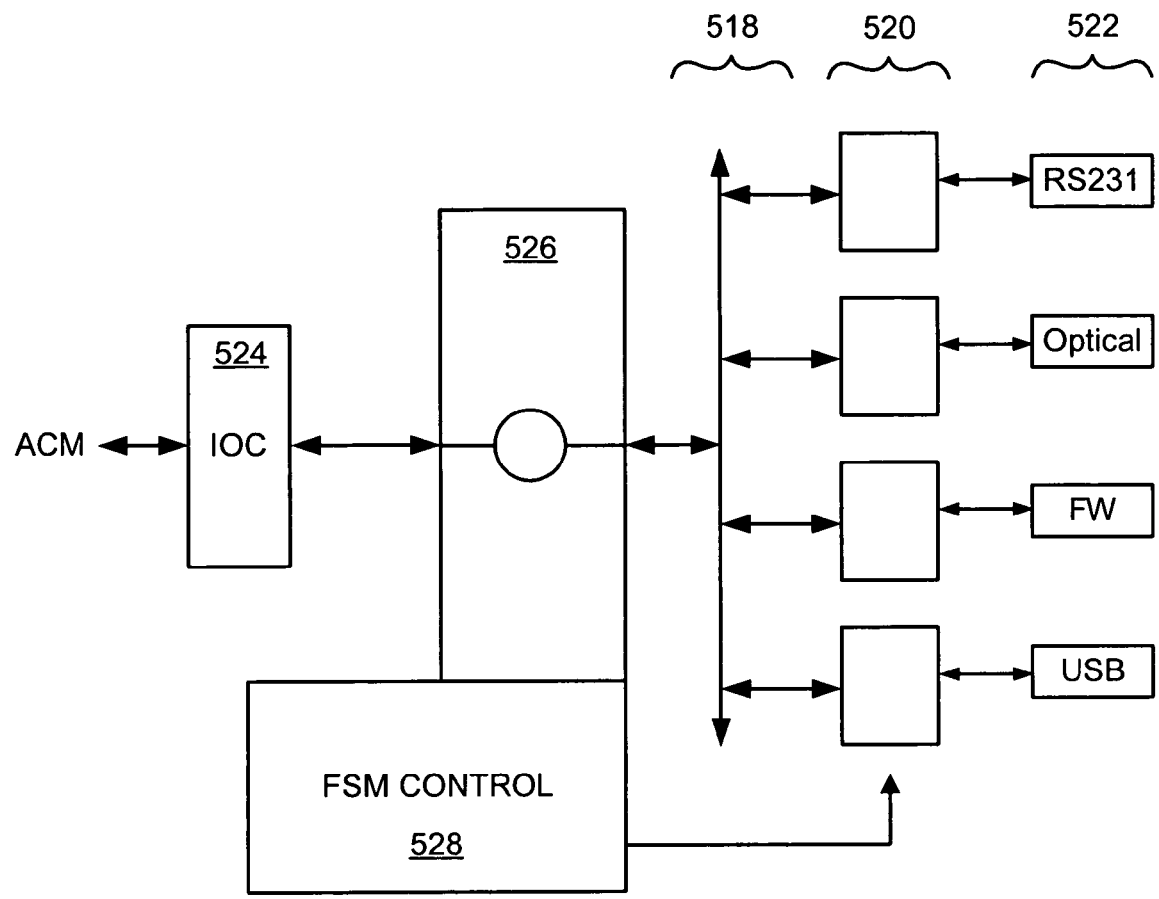
FIG. 55 shows further details of the physical link adapter and a configurable bus.

FIG. 55 shows further details of the physical link adapter and configurable bus of FIG. 54.

In FIG. 55, reconfigurable finite-state machine (RFSM) 528 acts to control bus switch 526 and couplings 520. Couplings 520 selectively connect signals from each communication type at 522 (e.g., a physical socket connector, output of a chip, received wireless or optical signal, etc.) to route the signals over bus 518 to bus switch 526. For example, couplings 520 can include multiplexers with selectable tri-state (or other high impedance) outputs. Each coupling can be selectively activated by a control signal from the RFSM. Other approaches can be used such as by using a switch, or other routing approach.

The signals from the selected interface are provided over bus 518 to bus switch 526. Note that any type of interconnection and switching scheme can be used besides that shown in FIG. 55. In a preferred embodiment, a single system bus is used at 518 and selected signals are placed onto the bus by the coupling circuitry under control of RFSM. Other approaches can use different mechanisms such as, e.g., packets sent over a shared network, dedicated lines, etc.

Bus switch 526 selectively routes signals to and from the system bus to the IOC. Other embodiments can route the signals to other ACE components or buses. In a preferred embodiment, the physical link adapter can reconfigure the external links every few clock cycles so that, for example, the IOC can be communicating with a first communication type (e.g., RS231) for 10-15 cycles and can then communicate with a second communication type (e.g., USB) for a next 10-15 cycles. Other embodiments can use any type of cycle allocation, timeslicing, or scheduled allocation, as desired.

Although a preferred embodiment of the physical link adapter uses a reconfigurable finite state machine, any type of suitable control system can be used. For example, a microprocessor controller can be employed. ASIC, FPGA or other designs can be used.

Although the invention has been discussed with respect to specific embodiments thereof, these embodiments are merely illustrative, and not restrictive, of the invention. For example, although an ACE system has been discussed in connection with various embodiments of the invention, some features, such as control and translation features of the IOC and aspects of the physical link adapter can be used with any type of architecture or other digital system.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An adaptive computing engine, comprising:
   a programmable interconnection network;
   a plurality of nodes, wherein each node included in the plurality of nodes has a fixed and different architecture that corresponds to a particular algorithmic function, and each node is coupled to one or more other nodes in the plurality of nodes via the programmable interconnection network;
   a reconfigurable input/output (I/O) controller coupled to a first node in the plurality of nodes via the programmable interconnection network, the reconfigurable I/O controller including:
      at least one input coupled to the programmable interconnection network for receiving a point-to-point transfer instruction from the first node, and
      at least one output for providing a translated point-to-point transfer instruction to an external device; and
   a physical link adapter coupled to the reconfigurable I/O controller, wherein the physical link adapter is coupled to coupling circuitry and includes a reconfigurable finite-state machine configured to control the coupling circuitry to selectively connect a signal from a physical connector.

2. The adaptive computing engine of claim 1, wherein the translated point-to-point transfer instruction provides translation of a port number in the adaptive computing engine to the external device.

3. The adaptive computing engine of claim 1, wherein the translated point-to-point transfer instruction provides translation of an address associated with the adaptive computing engine to an address associated with the external device.

4. The adaptive computing engine of claim 1, wherein the reconfigurable I/O controller further includes Peek/Poke service circuitry.

5. The adaptive computing engine of claim 1, wherein the reconfigurable I/O controller further includes memory random access circuitry.

6. The adaptive computing engine of claim 1, wherein the reconfigurable I/O controller further includes direct memory access circuitry.

7. The adaptive computing engine of claim 1, wherein the reconfigurable I/O controller further includes real time input circuitry.

8. The adaptive computing engine of claim 1, wherein the reconfigurable I/O controller further includes a status line coupled to the external device for indicating an availability of services.

9. The adaptive computing engine of claim 1, wherein the programmable interconnection network enables communication among the plurality of nodes and interfaces to reconfigure the adaptive computing engine for a variety of tasks.

10. The adaptive computing engine of claim 1, wherein the reconfigurable I/O controller runs at a clock rate associated with the programmable interconnection network.

11. The adaptive computing engine of claim 1, wherein the external devices include at least one adaptive computing engine, and at least one system on a chip (SOC).

12. The adaptive computing engine of claim 11, wherein the reconfigurable I/O controller further includes status lines coupled to the SOC, the SOC being responsive to the status lines to prioritize multiple external devices.

13. The adaptive computing engine of claim 1, wherein the external device includes at least one of a host computer and a central processing unit.

14. The adaptive computing engine of claim 11, wherein the SOC includes at least one of a storage system, a network access system, or a digital signal processor (DSP).

* * * * *